(12) United States Patent
Niizuma

(10) Patent No.: US 11,075,544 B2
(45) Date of Patent: Jul. 27, 2021

(54) POWER-TRANSMITTING DEVICE, POWER-RECEIVING DEVICE, AND WIRELESS POWER SUPPLY SYSTEM

(71) Applicant: IHI CORPORATION, Tokyo (JP)

(72) Inventor: Motonao Niizuma, Tokyo (JP)

(73) Assignee: IHI Corporation, Tokyo (JP)

( * ) Notice: Subject to any disclaimer, the term of this patent is extended or adjusted under 35 U.S.C. 154(b) by 121 days.

(21) Appl. No.: 16/443,196

(22) Filed: Jun. 17, 2019

(65) Prior Publication Data

US 2019/0305602 A1 Oct. 3, 2019

Related U.S. Application Data

(63) Continuation of application No. 15/360,061, filed on Nov. 23, 2016, now Pat. No. 10,367,378, which is a (Continued)

(30) Foreign Application Priority Data

Jun. 6, 2014 (JP) .................................. 2014-117710
Jun. 24, 2014 (JP) .................................. 2014-129347

(51) Int. Cl.
*H02J 50/12* (2016.01)
*B60L 53/12* (2019.01)
(Continued)

(52) U.S. Cl.
CPC .............. *H02J 50/12* (2016.02); *B60L 5/005* (2013.01); *B60L 53/12* (2019.02); *H01F 38/14* (2013.01);
(Continued)

(58) Field of Classification Search
CPC ............. B60L 53/12–126; B60L 53/34; B60L 53/38–39; H01F 38/14; B63G 2008/008
See application file for complete search history.

(56) References Cited

U.S. PATENT DOCUMENTS 3,387,606 A 6/1968 Crafts et al.
5,907,231 A 5/1999 Watanabe et al.
(Continued)

FOREIGN PATENT DOCUMENTS

CN 202513680 U 10/2012
JP 02-032721 A 2/1990
(Continued)

OTHER PUBLICATIONS

English machine translation of JP02032721 available Feb. 2, 1990. (Year: 1990).*

*Primary Examiner* — Rexford N Barnie
*Assistant Examiner* — David A Shiao
(74) *Attorney, Agent, or Firm* — Volpe Koenig

(57) ABSTRACT

A platform performs wireless power supply to an underwater mobile object having a relatively movable relationship using coil pairs disposed to be opposable. The platform includes: a recessed section configured to accommodate at least a part of the underwater mobile object with a gap; a coil configured to constitute the first opposable coil pair (5A) on a first wall portion of the recessed section facing each other; and a coil configured to constitute the second opposable coil pair on a second wall portion of the recessed section facing each other.

12 Claims, 17 Drawing Sheets

Related U.S. Application Data continuation of application No. PCT/JP2015/065885, filed on Jun. 2, 2015.

(51) Int. Cl.
| | | |
|---|---|---|
| *H02J 50/40* | (2016.01) | |
| B60L 5/00 | (2006.01) | |
| H01F 38/14 | (2006.01) | |
| *H02J 50/60* | (2016.01) | |
| *H02J 7/02* | (2016.01) | |
| B63G 8/00 | (2006.01) | |
| H02J 50/90 | (2016.01) | |

(52) U.S. Cl.
CPC ............ *H02J 7/025* (2013.01); *H02J 50/402* (2020.01); *H02J 50/60* (2016.02); *B60L 2200/32* (2013.01); *B60L 2240/36* (2013.01); *B63G 8/001* (2013.01); *B63G 2008/008* (2013.01); *H02J 50/40* (2016.02); *H02J 50/90* (2016.02); *Y02T 10/7072* (2013.01); *Y02T 90/14* (2013.01)

(56) References Cited

U.S. PATENT DOCUMENTS

| | | | |
|---|---|---|---|
| 5,917,307 | A | 6/1999 | Watanabe et al. |
| 5,929,599 | A | 7/1999 | Watanabe et al. |
| 6,032,546 | A | 3/2000 | Stone |
| 2005/0068009 | A1 | 3/2005 | Aoki |
| 2006/0104720 | A1 | 5/2006 | Haski et al. |
| 2008/0001696 | A1 | 1/2008 | Coulson et al. |
| 2012/0025761 | A1 | 2/2012 | Takada et al. |
| 2012/0298030 | A1 | 11/2012 | Lee et al. |
| 2013/0069586 | A1* | 3/2013 | Jung .................... H04B 5/0081 320/108 |
| 2014/0232200 | A1 | 8/2014 | Maekawa |
| 2015/0002092 | A1 | 1/2015 | Nizuma |
| 2015/0115728 | A1* | 4/2015 | Yamamoto .............. H02J 5/005 307/104 |
| 2015/0123609 | A1 | 5/2015 | Niizuma |
| 2015/0292222 | A1 | 10/2015 | Tamar |
| 2016/0005531 | A1 | 1/2016 | Sullivan |
| 2016/0256792 | A1 | 9/2016 | Mowbray |
| 2016/0318591 | A1 | 11/2016 | Jamieson |

FOREIGN PATENT DOCUMENTS

| | | | | |
|---|---|---|---|---|
| JP | 02032721 | A * | 2/1990 | .............. H02J 50/70 |
| JP | 10-108374 | A | 4/1998 | |
| JP | 10-256063 | A | 9/1998 | |
| JP | 11-041712 | A | 2/1999 | |
| JP | 2000-133536 | A | 5/2000 | |
| JP | 2000-217279 | A | 8/2000 | |
| JP | 2002-280241 | A | 9/2002 | |
| JP | 2004-166459 | A | 6/2004 | |
| JP | 2005-110399 | A | 4/2005 | |
| JP | 2007-001565 | A | 1/2007 | |
| JP | 2011-229244 | A | 11/2011 | |
| JP | 2011-229314 | A | 11/2011 | |
| JP | 2012-034468 | A | 2/2012 | |
| JP | 2012-228123 | A | 11/2012 | |
| JP | 2014-039403 | A | 2/2014 | |
| WO | 00/71415 | A1 | 11/2000 | |
| WO | 03/087501 | A1 | 10/2003 | |
| WO | 2013/085030 | A1 | 6/2013 | |
| WO | 2013/154097 | A1 | 10/2013 | |

\* cited by examiner

POWER-TRANSMITTING DEVICE, POWER-RECEIVING DEVICE, AND WIRELESS POWER SUPPLY SYSTEM

CROSS-REFERENCE TO RELATED APPLICATION

This application is a continuation of U.S. application Ser. No. 15/360,061 filed on Nov. 23, 2016, which is a continuation application based on PCT Patent Application No. PCT/JP2015/065885, filed on Jun. 2, 2015, whose priority is claimed on Japanese Patent Application No. 2014-117710, filed on Jun. 6, 2014, and Japanese Patent Application No. 2014-129347, filed on Jun. 24, 2014, which are each incorporated herein by reference as if fully set forth.

TECHNICAL FIELD

The present disclosure relates to a power-transmitting device, a power-receiving device, and a wireless power supply system.

Background Art

For example, in equipment that operates underwater, since it is difficult to use an internal combustion engine or to lay electric wires, electric power stored in a storage battery is often used as a power source. A wireless power supply system disclosed in Patent Document 1 has been proposed as a wireless power supply system for charging a storage battery underwater.

In such a wireless power supply system, when a distance between a power-receiving coil and a power-transmitting coil increases, power supply efficiency decreases (see Patent Document 2). Accordingly, in order to perform stable supply of power, it is preferable that the positional relationship between the power-receiving coil and the power-transmitting coil be fixed.

DOCUMENT OF RELATED ART

[Patent Document]
[Patent Document 1]
Japanese Unexamined Patent Application, First Publication No. 2004-166459
[Patent Document 2]
Japanese Unexamined Patent Application, First Publication No. 2012-344681

SUMMARY

Technical Problem

In a wireless power supply system, since a power-transmitting coil or a power-receiving coil that transmits or receives harmonic power emits heat, cooling thereof is performed. In a wireless power supply system disposed on the ground, the cooling is performed by dissipation of heat to air, but in a wireless supply system disposed underwater, since water is a liquid having a much larger heat capacity per unit volume than air, efficient cooling can be achieved by dissipation of heat to the water. However, as described in Patent Document 1, a power-receiving device and a power-transmitting device may come in close contact with each other, and the amount of liquid interposed between the power-receiving coil and the power-transmitting coil to take away heat is small when a positional relationship is firmly fixed, and the liquid is not exchanged. Accordingly, the temperature of the liquid is likely to increase. When the temperature of the liquid increases, there is a problem in that the liquid cannot absorb heat from the power-receiving coil or the power-transmitting coil and thus cooling of the power-receiving coil or the power-transmitting coil becomes difficult.

An object of the present disclosure is to provide a wireless power supply system, a power-transmitting device, and a power-receiving device that can appropriately cool a coil which emits heat due to wireless power supply underwater.
[Solution to Problem]

According to an aspect of the present disclosure, there is provided a power-transmitting device that performs wireless power supply to a power-receiving device having a relatively movable relationship using coil pairs disposed to be opposable, the power-transmitting device including: a recessed section configured to accommodate at least a part of the power-receiving device with a gap; a first coil configured to constitute the opposable coil pair on a first wall portion of the recessed section facing each other; and a second coil configured to constitute the opposable coil pair on a second wall portion of the recessed section facing each other.

According to another aspect of the present disclosure, there is provided a power-transmitting device that performs wireless power supply to a power-receiving device having a relatively movable relationship using coil pairs disposed to be opposable, the power-receiving device being provided with a recessed section, the power-transmitting device including: a body of which at least a part is accommodated in the recessed section with a gap; a first coil disposed in the body and configured to constitute the opposable coil pair on a first wall portion of the recessed section facing each other; and a second coil disposed in the body and configured to constitute the opposable coil pair on a second wall portion of the recessed section facing each other.

The power-transmitting device according to one aspect of the present disclosure may further include a controller configured to control power supplied respectively to the first coil and the second coil on the basis of power supply efficiency of the respective coil pairs on the first wall portion and the second wall portion of the recessed section facing each other.

In the power-transmitting device according to one aspect of the present disclosure, the wireless power supply to the power-receiving device including a load which is supplied with power by the wireless power supply may be performed, and the controller may increase power which is supplied to the coil constituting the coil pair with higher power supply efficiency and may decrease power which is supplied to the coil constituting the coil pair with lower power supply efficiency when the power supplied to the load is within a set range.

In the power-transmitting device according to one aspect of the present disclosure, the wireless power supply to the power-receiving device including a load which is supplied with power by the wireless power supply may be performed, and the controller may decrease the power which is supplied to the coil constituting the coil pair with lower power supply efficiency when the power supplied to the load is greater than a set range.

In the power-transmitting device according to one aspect of the present disclosure, the wireless power supply to the power-receiving device including a load which is supplied with power by the wireless power supply may be performed, and the controller may increase the power which is supplied to the coil constituting the coil pair with higher power supply efficiency when the power supplied to the load is less than a set range.

The power-transmitting device according to one aspect of the present disclosure may further include a scraper member configured to drive away a foreign material which is present between the coil pairs with movement relative to the power-receiving device.

In the power-transmitting device according to one aspect of the present disclosure, the wireless power supply may be performed underwater.

According to another aspect of the present disclosure, there is provided a power-receiving device that receives wireless power supply from a power-transmitting device having a relatively movable relationship using coil pairs disposed to be opposable, the power-receiving device including: a recessed section configured to accommodate at least a part of the power-transmitting device with a gap; a first coil configured to constitute the opposable coil pair on a first wall portion of the recessed section facing each other; and a second coil configured to constitute the opposable coil pair on a second wall portion of the recessed section facing each other.

According to another aspect of the present disclosure, there is provided a power-receiving device that receives wireless power supply from a power-transmitting device having a relatively movable relationship using coil pairs disposed to be opposable, the power-transmitting device being provided with a recessed section, the power-receiving device including: a body of which at least a part is accommodated in the recessed section with a gap; a first coil disposed in the body and configured to constitute the opposable coil pair on first wall portion of the recessed section facing each other; and a second coil disposed in the body and configured to constitute the opposable coil pair on the second wall portion of the recessed section facing each other.

The power-receiving device according to one aspect of the present disclosure may further include a scraper member configured to drive away a foreign material which is present between the coil pairs with relative movement to the power-transmitting device.

In the power-receiving device according to one aspect of the present disclosure, the wireless power supply may be performed underwater.

According to another aspect of the present disclosure, there is provided a wireless power supply system that performs wireless power supply using coil pairs disposed to be opposable between a power-receiving device and a power-transmitting device of which at least one is movable, the wireless power supply system including: the aforementioned power-transmitting device including the recessed section as the power-transmitting device; and the aforementioned power-receiving device including the body which is accommodated in the recessed section as the power-receiving device.

According to another aspect of the present disclosure, there is provided a wireless power supply system that performs wireless power supply using coil pairs disposed to be opposable between a power-receiving device and a power-transmitting device of which at least one is movable, the wireless power supply system including: the aforementioned power-receiving device including the recessed section as the power-receiving device; and the aforementioned power-transmitting device including the body which is accommodated in the recessed section as the power-transmitting device.

According to another aspect of the present disclosure, there is provided a wireless power supply system in which at least one of a power-receiving device and a power-transmitting device is disposed in an underwater mobile object and a receiving-side pad including a coil of the power-receiving device and a transmitting-side pad including a coil of the power-transmitting device oppose each other with liquid interposed between the receiving-side pad and the transmitting-side pad, the wireless power supply system performing wireless power supply using magnetic coupling of the coils, the wireless power supply system including: a spacer member including a gap for forming a flow of the liquid between the receiving-side pad and the transmitting-side pad.

The wireless power supply system according to one aspect of the present disclosure may further include a liquid flow device configured to apply a flow to the liquid.

In the wireless power supply system according to one aspect of the present disclosure, the liquid flow device may be a thruster disposed in the underwater mobile object.

The wireless power supply system according to one aspect of the present disclosure may further include a movement restricting portion configured to restrict movement of the underwater mobile object when the thruster applies a flow to the liquid.

In the wireless power supply system according to one aspect of the present disclosure, the spacer member may include a gap of which a width gradually decreases to an opposing area in which the coils oppose each other on an upstream side of the opposing area in a direction of flow of the liquid by the liquid flow device.

In the wireless power supply system according to one aspect of the present disclosure, opposing surfaces of the receiving-side pad and the transmitting-side pad may be disposed inclined with respect to a horizontal plane.

In the wireless power supply system according to one aspect of the present disclosure, opposing surfaces of the receiving-side pad and the transmitting-side pad may be disposed perpendicular to a horizontal plane.

In the wireless power supply system according to one aspect of the present disclosure, the spacer member may be disposed in a shape of fins.

In the wireless power supply system according to one aspect of the present disclosure, the spacer member may be disposed in the underwater mobile object and a center fin in a width direction of the underwater mobile object may be lower than end fins.

The wireless power supply system according to one aspect of the present disclosure may further include a heat transfer plate configured to thermally connect the back of the coil disposed in the underwater mobile object and a surface of the underwater mobile object.

According to another aspect of the present disclosure, there is provided a power-transmitting device that includes a transmitting-side pad including a coil and that performs wireless power supply to a receiving-side pad including a coil of a power-receiving device using magnetic coupling of the coils, wherein a spacer member is disposed on the transmitting-side pad and the spacer member includes a gap for forming a flow of liquid between the receiving-side pad and the transmitting-side pad when the transmitting-side pad opposes the receiving-side pad with the liquid interposed between the transmitting-side pad and the receiving-side pad.

According to another aspect of the present disclosure, there is provided a power-receiving device that includes a receiving-side pad including a coil and receives wireless power supply from a transmitting-side pad including a coil of a power-transmitting device using magnetic coupling of the coils, wherein a spacer member is disposed on the receiving-side pad and the spacer member includes a gap for forming a flow of liquid between the receiving-side pad and the transmitting-side pad when the receiving-side pad opposes the transmitting-side pad with the liquid interposed between the receiving-side pad and the transmitting-side pad.

[Effects]

According to the present disclosure, the spacer having a gap is disposed between the receiving-side pad and the transmitting-side pad and a flow of liquid is formed between the receiving-side pad and the transmitting-side pad. When a flow of liquid is formed between the receiving-side pad and the transmitting-side pad, the liquid having taken away heat from the coils and having increased in temperature is eliminated from between the receiving-side pad and the transmitting-side pad and new liquid is introduced between the receiving-side pad and the transmitting-side pad. Accordingly, it is possible to keep the temperature of the liquid interposed between the receiving-side pad and the transmitting-side pad low and to suppress a decrease in cooling efficiency.

Therefore, according to the present disclosure, it is possible to provide a wireless power supply system, a power-transmitting device, and a power-receiving device that can appropriately cool a coil which emits heat due to wireless power supply underwater.

DESCRIPTION OF EMBODIMENTS

Hereinafter, embodiments of the present disclosure will be described with reference to the accompanying drawings.

First Embodiment

Figure 1:
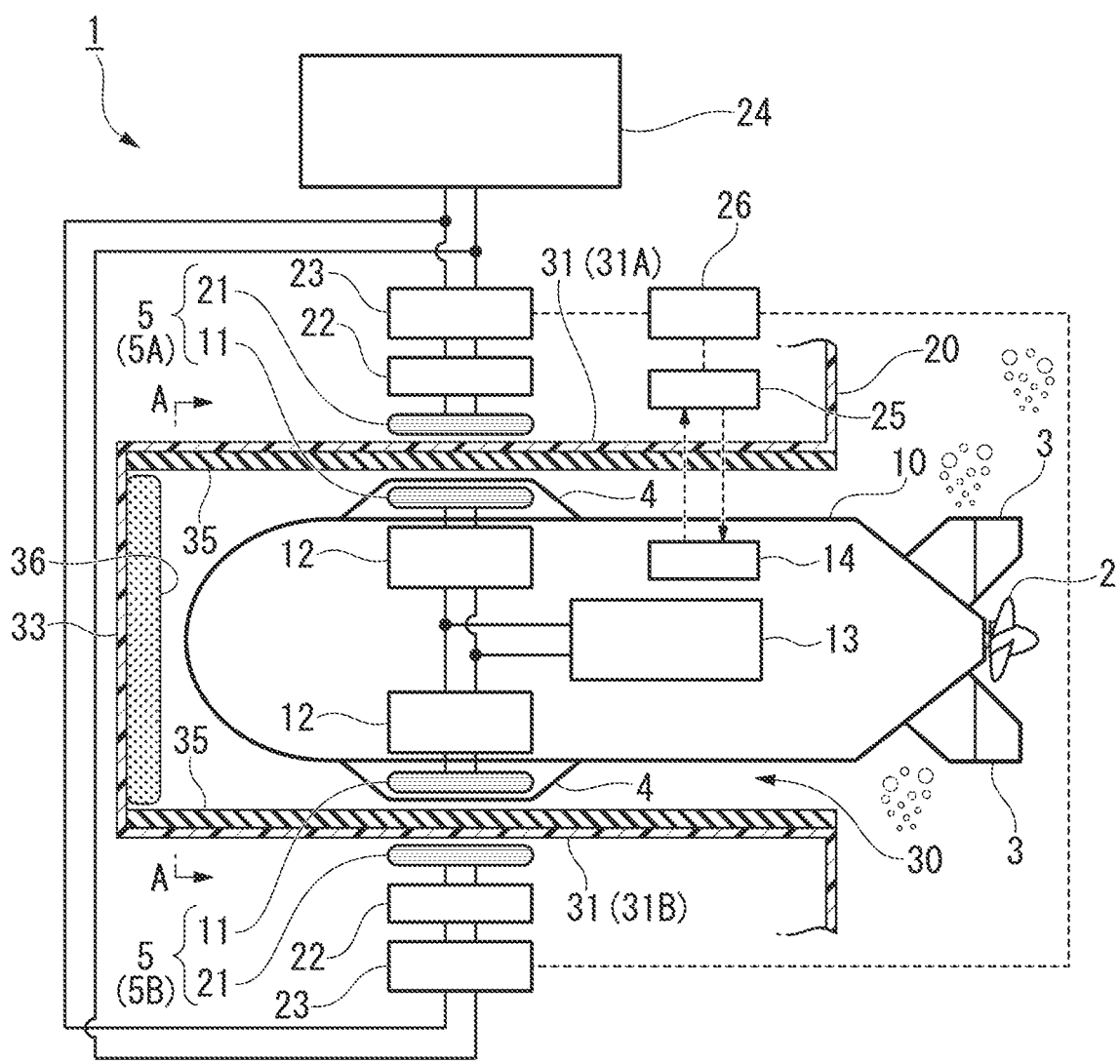
FIG. 1 is a diagram showing the entire configuration of a wireless power supply system according to a first embodiment of the present disclosure.
Figure 2:
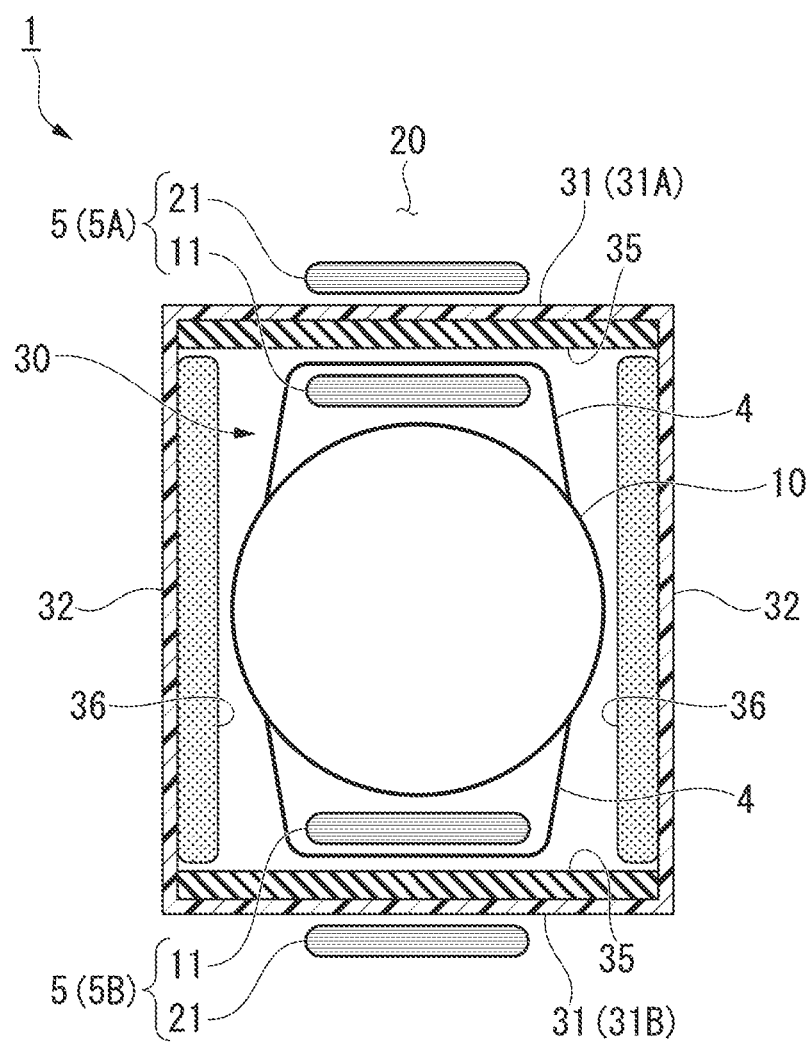
FIG. 2 is a diagram taken along arrow A-A in FIG. 1.

FIG. 1 is a diagram showing the entire configuration of a wireless power supply system according to a first embodiment of the present disclosure. FIG. 2 is a diagram taken along arrow A-A in FIG. 1.

The wireless power supply system 1 functions to perform wireless power supply using coil pairs 5 between a power-receiving device and a power-transmitting device of which at least one is movable. In this embodiment, as shown in FIG. 1, an underwater mobile object 10 (power-receiving device, power-transmitting device, body) functions as a power-receiving device and a platform 20 (power-transmitting device, power-receiving device) to which the underwater mobile object 10 is returned functions as a power-transmitting device. The underwater mobile object 10 is configured to move relative to the platform 20.

The underwater mobile object 10 is an autonomous unmanned underwater vehicle that can tracklessly navigate in water and has, for example, mission equipment for undersea search (not shown) mounted thereon. Examples of the mission equipment include a sonar device for inspecting the topography of a sea bottom or acquiring strata information under the sea bottom, a thermometer for measuring a temperature of seawater, and a sensor for measuring distribution information of specific chemicals in seawater according to the amount of light absorbed.

In order to control a navigation speed or a navigation direction, the underwater mobile object 10 includes, for example, a main thruster 2 in the rear part, rudders 3 (upper and lower rudder fins) on the upper and lower sides of the rear part, elevators (right and left rudder fins (not shown)) on the right and left sides of the rear part, and a vertical thruster (not shown) and a horizontal thruster (not shown) in the front part. Speed control is performed by changing the rotating speed of the main thruster 2. Lateral angle control is performed by controlling the lateral angles of the rudders 3 as a rudder and the horizontal thruster is used together with this when the underwater mobile object turns with a smaller radius. Elevation angle control is performed by controlling the elevation angles of the right and left elevators as a rudder and the vertical thruster is used together with this when the underwater mobile object turns with a smaller radius.

The underwater mobile object 10 is provided with a power-receiving coil 11 (first coil, second coil). The power-receiving coil 11 is disposed in the back of a cover member 4 that has satisfactory water resistance and pressure resistance and that is formed of a nonmagnetic and nonconductive material (such as plastics or fiber-reinforced plastics) transmitting an electromagnetic field which is used for the wireless power supply. The cover member 4 has a smoothly shaped surface and thus flow resistance that interferes with navigation can be decreased.

The power-receiving coils 11 are disposed in an upper part and a lower part of a substantially cylindrical body of the underwater mobile object 10. The power-receiving coil 11 is wirelessly receives AC power by electromagnetic coupling to a power-transmitting coil 21 (first coil, second coil) disposed in the platform 20. In this wireless power supply, since an electrode or a connector exposed to the outside is not necessary, the electrode or the connector is not damaged due to an external influence and the electrode does not become rusty underwater during the supply of power. When the wireless power supply is possible, the shape, size, or type (such as a solenoid type or a circular type) of the power-receiving coil 11 or the power-transmitting coil 21 is not particularly limited and the power-receiving coil 11 and the power-transmitting coil 21 may be different from each other in shape and size.

The wireless power supply from the power-transmitting coil 21 to the power-receiving coil 11 in the wireless power supply system 1 according to this embodiment is performed on the basis of a magnetic resonance system. That is, resonance capacitors (not shown) constituting resonance circuits are connected to the power-transmitting coil 21 and the power-receiving coil 11, respectively. For example, the capacitance of the resonance capacitors is set such that the resonance frequency of the transmitting-side resonance circuit including the power-transmitting coil 21 and a resonance capacitor and the resonance frequency of the receiving-side resonance circuit including the power-receiving coil 11 and a resonance capacitor are the same frequency.

The underwater mobile object 10 includes a receiving-side power conversion circuit 12, a load 13, and a communication device 14 in addition to the power-receiving coil 11.

The receiving-side power conversion circuit 12 is a power conversion circuit that converts received power, which is received through the wireless power supply from the power-transmitting coil 21 by the power-receiving coil 11, into DC power and supplies the converted DC power to the load 13. That is, the receiving-side power conversion circuit 12 supplies a current to the load 13, and the current is determined depending on impedance of the load 13, an output of a transmitting-side power conversion circuit 23, and circuit characteristics thereof (a transmitting-side DC-AC conversion circuit 22, the power-transmitting coil 21, transmission of an electromagnetic field between the power-transmitting coil 21 and the power-receiving coil 11, and the receiving-side power conversion circuit 12). The receiving-side power conversion circuit 12 may include only a rectifier circuit (for example, a diode bridge) and a smoothing circuit (for example, a π type circuit including a reactor and a capacitor) or may additionally include a DC/DC converter.

The receiving-side power conversion circuit 12 is provided for each of two power-receiving coils 11, and the outputs of the two receiving-side power conversion circuits 12 are connected in parallel to each other and are connected to the load 13. That is, a total power of DC power which is received by the upper power-receiving coil 11 in FIG. 1 (a first coil of a power-receiving device to be described later) and which is converted by the upper receiving-side power conversion circuit 12 and DC power which is received by the lower power-receiving coil 11 in FIG. 1 (a second coil of a power-receiving device to be described later) and which is converted by the lower receiving-side power conversion circuit 12 is supplied to the load 13.

The load 13 is a power storage device that can accumulate power sufficient for a driving power source of the underwater mobile object 10, and examples thereof include a lithium ion secondary battery, a nickel-hydrogen secondary battery, and an electric double-layer capacitor with a large capacity. Examples of the load 13 include a load other than the power storage device, such as a resistance load (for example, a heat emitter or an illumination device) and inductance load (for example, a combination of an inverter having a DC/AC conversion function and a motor) and a combination of a power storage device and a load other than the power storage device.

The communication device 14 communicates with a communication device 25 disposed in the platform 20. An acoustic communication unit is preferably employed for communication in the water. Over a short distance, a radio communication unit or an optical communication unit may be used.

The platform 20 is a ship on water or a station in water to which the underwater mobile object 10 is returned. The platform 20 is provided with a recessed section 30 which can accommodate at least a part of the underwater mobile object 10 (a body) with a gap. As shown in FIG. 2, the recessed section 30 in this embodiment is a horizontal hole which has an opening larger than the underwater mobile object 10. The recessed section 30 opens in a rectangular shape and includes wall portions 31 which form upper and lower sides of a rectangle and face each other and wall portions 32 which form right and left sides of the rectangle and face each other. As shown in FIG. 1, the recessed section 30 includes a wall portion 33 that is connected to the wall portions 31 and 32 and faces the head part of the underwater mobile object 10.

The platform 20 is provided with a power-transmitting coil 21. The power-transmitting coils 21 are disposed in the back of the wall portions 31 that have satisfactory water resistance and pressure resistance and that are formed of a nonmagnetic and nonconductive material (such as plastics or fiber-reinforced plastics) transmitting an electromagnetic field which is used for the wireless power supply. The wall portions 32 and 33 are formed integrally with the wall portions 31, but are not disposed in an area through which an electromagnetic field for the wireless power supply passes and thus do not need to be formed of a nonmagnetic and nonconductive material.

A shock absorbing member 35 that absorbs a shock due to collision of the underwater mobile object 10 with a water current, a sea current, or the like is disposed on the surfaces of the wall portions 31. The shock absorbing member 35 is formed of a nonmagnetic and nonconductive material having resilience such as rubber. The wall portions 32 and 33 are provided with a shock absorbing member 36 that absorbs a shock due to collision of the underwater mobile object 10 with a water current, a sea current, or the like. The shock absorbing member 36 is not disposed in an area through which the electromagnetic field for the wireless power supply passes and thus the material thereof is not particularly limited as long as it has resilience.

The power-transmitting coil 21 is disposed in the back of each of the wall portions 31 of the recessed section 30 vertically facing each other. The power-receiving coil 11 (the first coil of the power-receiving device) and the power-transmitting coil 21 (the first coil of the power-transmitting device) which are disposed to be opposable in a first wall portion 31 (the wall portion 31A) of the recessed section 30 facing each other form a first coil pair 5A. The power-receiving coil 11 (the second coil of the power-receiving device) and the power-transmitting coil 21 (the second coil of the power-transmitting device) which are disposed to be opposable in the other (the wall portion 31B) of the wall portions 31 of the recessed section 30 facing each other form a second coil pair 5B.

The platform 20 includes a transmitting-side DC-AC conversion circuit 22, a transmitting-side power conversion circuit 23, a power source 24, a communication device 25, and a controller 26, in addition to the power-transmitting coil 21.

The transmitting-side DC-AC conversion circuit 22 includes a circuit such as a half bridge or a full bridge which is generally used as a transmitting-side inverter circuit, converts DC power supplied from the transmitting-side power conversion circuit 23 into AC power suitable for the wireless power supply in a magnetic resonance system, and supplies the converted AC power to the power-transmitting coil 21. The inverter circuit generally employs a method of driving a gate of a semiconductor power element such as a power MOSFET (Metal-Oxide-Semiconductor Field-Effect Transistor) or an IGBT (Insulated Gate Bipolar Transistor) with a pulse signal and performing pulse width modulation (PWM) while changing the period or length of the pulse signal.

As shown in FIG. 1, the transmitting-side DC-AC conversion circuit 22 is disposed for each power-transmitting coil 21.

The transmitting-side power conversion circuit 23 is a power conversion circuit that converts power supplied from the power source 24 into DC power and supplies the converted DC power to the transmitting-side DC-AC conversion circuit 22 and can change the output power in accordance with a command from the controller 26. When AC power is supplied from the power source 24, the transmitting-side power conversion circuit 23 has a configuration in which a rectifier circuit constituted by, for example, a diode bridge and a DC/DC converter having a stepping-up function, a stepping-down function, or a stepping-up/down function are combined and may be configured to have additionally a power factor correction (PFC) function. When DC power is supplied from the power source 24, the transmitting-side power conversion circuit 23 may be a DC/DC converter having a stepping-up function, a stepping-down function, or a stepping-up/down function.

In this configuration, the output power of the transmitting-side power conversion circuit 23 can be changed by changing the output voltage of the DC/DC converter. The converter to be used may be any one of a non-insulated type (such as a chopper) and an insulated type (such as use of a transformer).

As shown in FIG. 1, the transmitting-side power conversion circuit 23 is disposed for each transmitting-side DC-AC conversion circuit 22.

The power source 24 is, for example, a commercial power source, a solar battery, or a wind power generator and supplies power thereof to the transmitting-side power conversion circuit 23.

The communication device communicates with the underwater mobile object 10. For example, the communication device 25 performs acoustic positioning using ultrasonic waves to position the underwater mobile object 10 in water. For example, an ultra-short base line (USBL) system can be employed as the acoustic positioning. In the USBL, the distance to a target (the underwater mobile object 10) can be determined from a round-trip time of sound waves and an underwater sound velocity, an angle can be determined from a phase difference of sound waves in a wave receiver array (an arrangement of a plurality of wave receivers) of the USBL, and the position of the target in a three-dimensional space relative to a USBL transceiver (wave transmitter and receiver) can be calculated.

In the platform 20 equipped with the transceiver, the latitude and longitude of the target is acquired by adding a position relative to the target to the position (longitude and latitude) of the transceiver in the terrestrial coordinate system and an attitude angle (the inclination from a horizontal line and the azimuth). By transmitting the position to the underwater mobile object 10 by acoustic communication, the underwater mobile object 10 can acquire its current position. An inertial navigation method may be employed as the underwater positioning or may be used together with the acoustic positioning in order to enhance navigation accuracy.

The inertial navigation method is a method of measuring the attitude angle (the lateral angle, the elevation angle, and the azimuth angle) of a target and the velocity of the target relative to the sea bottom in a three-dimensional space using a sensor (for example, a gyro or a Doppler flowmeter) mounted on the target for a short time, calculating the direction in which the target moves in the terrestrial coordinate system and the distance by which the target moves, and adding the calculated values. The inertial navigation method has a merit that a position can be measured at short intervals, but since a position error increases with the lapse of time, accumulation of the position error can be prevented by periodically replacing the position measured using the inertial navigation method with the position measured using the USBL in which the position error does not increase with the lapse of time.

The controller 26 is connected to the communication device 25, operates the transmitting-side power conversion circuit 23 after confirming that the underwater mobile object 10 is accommodated in the recessed section 30 of the platform 20, and causes the underwater mobile object 10 and the platform 20 to perform wireless power supply using a first coil pair 5A and a second coil pair 5B which are disposed to be opposable. The controller 26 controls power supplied to the first coil pair 5A and the second coil pair 5B on the basis of power supply efficiency of the first coil pair 5A and the second coil pair 5B.

Specifically, the controller 26 acquires power ($Pr\_1$: a measured value) which is received by the receiving-side power conversion circuit 12 connected to the power-receiving coil 11 forming the first coil pair 5A, power ($Pr\_2$: a measured value) which is received by the receiving-side power conversion circuit 12 connected to the power-receiving coil 11 forming the second coil pair 5B, and power ($Pbatt$: an output value from a battery controller (not shown)) required for charging the load 13 using the communication devices 14 and 25 from the underwater mobile object 10 and the platform 20. The measuring of power can be performed by measuring a DC voltage and a DC current at an output terminal of the receiving-side power conversion circuit 12 in a much shorter period than power fluctuation and averaging an instantaneous power value obtained by multiplying the voltage value and the current value measured at each time with respect to time.

The controller 26 acquires power ($Ps\_1$: a measured value) which is supplied from the transmitting-side power conversion circuit 23 connected to the power-transmitting coil 21 forming the first coil pair 5A via the transmitting-side DC-AC conversion circuit 22 and power ($Ps\_2$: a measured value) which is supplied from the transmitting-side power conversion circuit 23 connected to the power-transmitting coil 21 forming the second coil pair 5B via the transmitting-side DC-AC conversion circuit 22. The measuring of power can be performed by measuring a DC voltage and a DC current at an input terminal of the transmitting-side DC-AC conversion circuit 22 in a much shorter period than the power fluctuation and averaging an instantaneous power value obtained by multiplying the voltage value and the current value measured at each time with respect to time. $Ps\_1$, $Pr\_1$, $Ps\_2$, $Pr\_2$, and $Pbatt$ are values that vary with the lapse of time.

The controller 26 calculates the power supply efficiency of the first coil pair 5A and the second coil pair 5B from losses of the first coil pair 5A and the second coil pair 5B, respectively. The loss of the first coil pair 5A can be calculated by subtraction of $Ps\_1-Pr\_1$. The loss of the second coil pair 5B can be calculated by subtraction of $Ps\_2-Pr\_2$. The controller 26 determines that the power supply efficiency of the first coil pair 5A is higher because when $Ps\_1-Pr\_1<Ps\_2-Pr\_2$ is satisfied, the loss of the first coil pair 5A is smaller. The controller 26 determines that the power supply efficiency of the second coil pair 5B because when $Ps\_1-Pr\_1>Ps\_2-Pr\_2$ is satisfied, the loss of the second coil pair 5B is smaller. In determining the power supply efficiency, $(Ps\_1-Pr\_1)/Ps\_1$ may be used instead of $Ps\_1-Pr\_1$ and $(Ps\_2-Pr\_2)/Ps\_2$ may be used instead of $Ps\_2-Pr\_2$ in consideration of transmitted power.

The controller 26 determines excess and deficiency of power in the load 13. The controller 26 determines that is "appropriate power" when $Pr\_1+Pr\_2=Pbatt$ is satisfied. The controller 26 determines that it is "excessive power" when $Pr\_1+Pr\_2<Pbatt$ is satisfied. The controller 26 determines that it is "deficient power" otherwise. Since a measured value includes an error, it is preferable that the determination of a sign of equality be provided with a width (a dead zone). Accordingly, the controller 26 determines whether power supplied to the load 13 is within a set range having a certain width, greater than the set range, or otherwise (smaller than the set range).

As described in (1) to (6), the controller 26 changes power command values to the transmitting-side power conversion circuit 23 of the first coil pair 5A and the transmitting-side power conversion circuit 23 to the second coil pair 5B. In the following description, Δ denotes a positive micro quantity.

(1) When "appropriate power" is determined and the loss of the first coil pair 5A is small The controller 26 increases the power command value to the transmitting-side power conversion circuit 23 of the first coil pair 5A by Δ and decreases the power command value to the transmitting-side power conversion circuit 23 of the second coil pair 5B by Δ.

(2) When "appropriate power" is determined and the loss of the second coil pair 5B is small The controller 26 decreases the power command value to the transmitting-side power conversion circuit 23 of the first coil pair 5A by 4 and increases the power command value to the transmitting-side power conversion circuit 23 of the second coil pair 5B by 4.

That is, when the power supplied to the load 13 is within the set range, the controller 26 increases the power supplied to the coil pair 5 having higher power supply efficiency and decreases the power supplied to the coil pair 5 having lower power supply efficiency.

(3) When "excessive power" is determined and the loss of the first coil pair 5A is small The controller 26 does not change the power command value to the transmitting-side power conversion circuit 23 of the first coil pair 5A and decreases the power command value to the transmitting-side power conversion circuit 23 of the second coil pair 5B by 4.

(4) When "excessive power" is determined and the loss of the second coil pair 5B is small The controller 26 decreases the power command value to the transmitting-side power conversion circuit 23 of the first coil pair 5A by 4 and does not change the power command value to the transmitting-side power conversion circuit 23 of the second coil pair 5B.

That is, when the power supplied to the load 13 is greater than the set range, the controller 26 decreases the power supplied to the coil pair 5 having lower power supply efficiency.

(5) When "deficient power" is determined and the loss of the first coil pair 5A is small The controller 26 increases the power command value to the transmitting-side power conversion circuit 23 of the first coil pair 5A by 4 and does not change the power command value to the transmitting-side power conversion circuit 23 of the second coil pair 5B.

(6) When "deficient power" is determined and the loss of the second coil pair 5B is small The controller 26 does not change the power command value to the transmitting-side power conversion circuit 23 of the first coil pair 5A and increases the power command value to the transmitting-side power conversion circuit 23 of the second coil pair 5B by 4.

That is, when the power supplied to the load 13 is smaller than the set range, the controller 26 increases the power supplied to the coil pair 5 having higher power supply efficiency.

A power supply operation of the wireless power supply system 1 having the above-mentioned configuration will be described below.

As shown in FIG. 1, the wireless power supply system 1 performs wireless power supply to the underwater mobile object 10 that has been returned to the platform 20. The underwater mobile object 10 determines whether to be returned to the platform 20 on the basis of the state of charge of the load 13, and grasps its current position by communication between the communication devices 14 and 25 and is returned to the platform 20 when it is determined that the underwater mobile object should be returned to the platform. The underwater mobile object 10 returned to the platform 20 enters the recessed section 30 disposed in the platform 20 and is supplied with power. When the state of charge decreases to the state of charge in which it is necessary to return the underwater mobile object to the platform 20, it is generally determined that the underwater mobile object should be returned.

As shown in FIG. 1, the wireless power supply system 1 according to this embodiment includes the recessed section 30 that is disposed in the platform 20 and that can accommodate at least a part of the underwater mobile object 10 with a gap. According to this configuration, since the underwater mobile object 10 can be accommodated in the recessed section 30 of the platform 20 with a gap, the underwater mobile object 10 can freely move to a certain extent during the supply of power. According to this embodiment, a high-precision positioning mechanism as in the related art is not necessary and a mechanical constraint unit is not used. Accordingly, even when an external force is suddenly applied due to collision with waste, driftwood, or the like, the underwater mobile object does not moving against the external force but can easily move from a predetermined positioned state without causing mechanical destruction of the constraint unit or the like. Accordingly, it is possible to prevent the underwater mobile object 10 and the platform 20 from being damaged. Since the underwater mobile object 10 can be accommodated in the recessed section 30 of the platform 20 with a gap, liquid is present between the platform 20 and the underwater mobile object 10. The liquid absorbs heat from the power-transmitting coil 21 disposed in the platform 20 and the power-receiving coil 11 disposed in the underwater mobile object. Accordingly, it is possible to appropriately cool the power-transmitting coil 21 and the power-receiving coil 11 emitting heat.

On the other hand, when the underwater mobile object 10 can freely move to a certain extent during the supply of power and the distance between the power-receiving coil 11 and the power-transmitting coil 21 increases, the power supply efficiency decreases. Accordingly, the wireless power supply system 1 according to this embodiment includes the first coil pair 5A which is disposed to be opposable on one (the wall portion 31A side) of the wall portions 31 of the recessed section 30 facing each other and the second coil pair 5B which is disposed to opposable on the other (the wall portion 31B side) of the wall portions 31 of the recessed section 30 facing each other. According to this configuration, even when the underwater mobile object 10 moves in the recessed section 30 of the platform 20, for example, even when the underwater mobile object 10 becomes farther from the wall portion 31A and the power supply efficiency of the first coil pair 5A decreases, the underwater mobile object 10 becomes closer to the wall portion 31B and thus the power supply efficiency of the second coil pair 5B. In contrast, even when the underwater mobile object 10 becomes farther from the wall portion 31B and the power supply efficiency of the second coil pair 5B decreases, the underwater mobile object 10 becomes closer to the wall portion 31A and thus the power supply efficiency of the first coil pair 5A increases. The supply of power to the underwater mobile object 10 is performed using both the first coil pair 5A and the second coil pair 5B, and the power supply efficiency of one side increases and compensates even when the power supply efficiency of the other side decreases. Accordingly, it is possible to prevent the total power supply efficiency from decreasing.

The wireless power supply system 1 according to this embodiment includes the controller 26 that controls power supplied to the first coil pair 5A and the second coil pair 5B on the basis of the power supply efficiency of the first coil pair 5A and the second coil pair 5B. According to this configuration, by supplying a larger amount of power via the coil pair 5 having higher power supply efficiency and supplying a smaller amount of power via the coil pair 5 having lower power supply efficiency, it is possible to enhance the total efficiency and to supply necessary power to the load 13.

Specifically, the controller 26 according to this embodiment increases the power supplied to the coil pair 5 having higher power supply efficiency and decreases the power supplied to the coil pair 5 having lower power supply efficiency, when the power supplied to the load 13 is within the set range. That is, the controller 26 does not change the combined power to the first coil pair 5A and the second coil pair 5B and increases the power to the coil pair 5 having a lower loss by the control described above in (1) and (2). In this way, when the relative position of the underwater mobile object 10 to the platform 20 varies with the lapse of time due to an influence of a water current or a sea current, it is possible to supply power with high efficiency by appropriately distributing the power supplies to the first coil pair 5A and the second coil pair 5B on the basis of the power supply efficiency.

The controller 26 according to this embodiment decreases the power supplied to the coil pair 5 having lower power supply efficiency when the power supplied to the load 13 is greater than the set range. That is, the controller 26 decreases the combined power to the first coil pair 5A and the second coil pair 5B and decreases the power to the coil pair 5 having a higher loss by the control described above in (3) and (4). In this way, when the relative position of the underwater mobile object 10 to the platform 20 varies with the lapse of time due to an influence of a water current or a sea current and excessive power is determined, it is possible to supply power with high efficiency by appropriately decreasing the power supplied to the coil pair 5 having lower power supply efficiency.

The controller 26 according to this embodiment increases the power supplied to the coil pair 5 having higher power supply efficiency when the power supplied to the load 13 is smaller than the set range. That is, the controller 26 increases the combined power to the first coil pair 5A and the second coil pair 5B and increases the power to the coil pair 5 having a lower loss by the control described above in (5) and (6). In this way, when the relative position of the underwater mobile object 10 to the platform 20 varies with the lapse of time due to an influence of a water current or a sea current and deficient power is determined, it is possible to supply power with high efficiency by appropriately increasing the power supplied to the coil pair 5 having higher power supply efficiency.

In this way, according to the above-mentioned embodiment, as the wireless power supply system 1 that performs wireless power supply using the coil pairs 5 disposed to be opposable between the underwater mobile object 10 and the platform 20, it is possible to provide a wireless power supply system 1 that can prevent the underwater mobile object 10 and the platform 20 from being damaged and to suppress a decrease in power supply efficiency by employing the configuration including the recessed section 30 disposed in the platform 20 and configured to accommodate at least a part of the underwater mobile object 10 with a gap, the first coil pair 5A disposed to be opposable on one of the wall portions 31 of the recessed section 30 facing each other and the second coil pair 5B disposed to be opposable on the second wall portion 31 of the recessed section 30 facing each other as the coil pairs 5.

The electromagnetic field for wireless power supply generated between the power-transmitting coil 21 and the power-receiving coil 11 passes through the wall portions 31, the shock absorbing member 35, and the cover member 4, but these constituents are formed of a nonmagnetic and nonconductive material and thus do not decrease the power supply efficiency.

A water current or a sea current is present underwater and waste or driftwood floating underwater is also present. Accordingly, when the supply of power is performed in a state in which the positional relationship between the power-receiving device (an underwater station) and the power-transmitting device (an underwater robot) is strongly fixed as described in Patent Document 1, there is a possibility the devices will be damaged due to collision with the waste or driftwood. Accordingly, it is preferable that the supply of power be performed in a state in which the power-receiving device and the power-transmitting device is weakly fixed such that the relative position of the power-transmitting device and the power-receiving device can freely move to a certain extent. However, in this case, the distance between the power-receiving coil and the power-transmitting coil may increase and the power supply efficiency may decrease.

According to one aspect of the present disclosure, by disposing the recessed section in one of the power-receiving device and the power-transmitting device and accommodating at least a part of the other in the recessed section so as to be freely movable to a certain extent, it is possible to easily release the positioned state even when an external force is suddenly applied. As a result, it is possible to prevent the power-receiving device and the power-transmitting device from being damaged. According to one aspect of the present disclosure, by disposing a coil pair on one of the wall portions of the recessed section facing each other and disposing a coil pair on the other, the inter-coil distance of the other coil pair decreases to increase the power supply efficiency even when the power-receiving device and the power-transmitting device move in the recessed section, for example, even when the inter-coil distance of the one coil pair increases to decrease the power supply efficiency. As a result, it is possible to suppress a decrease in power supply efficiency.

Accordingly, according to one aspect of the present disclosure, it is possible to prevent the power-receiving device and the power-transmitting device from being damaged and to suppress a decrease in power supply efficiency.

The first embodiment is not limited to the aforementioned configuration and can employ, for example, modified examples described below in (1) to (4).

Figure 3:
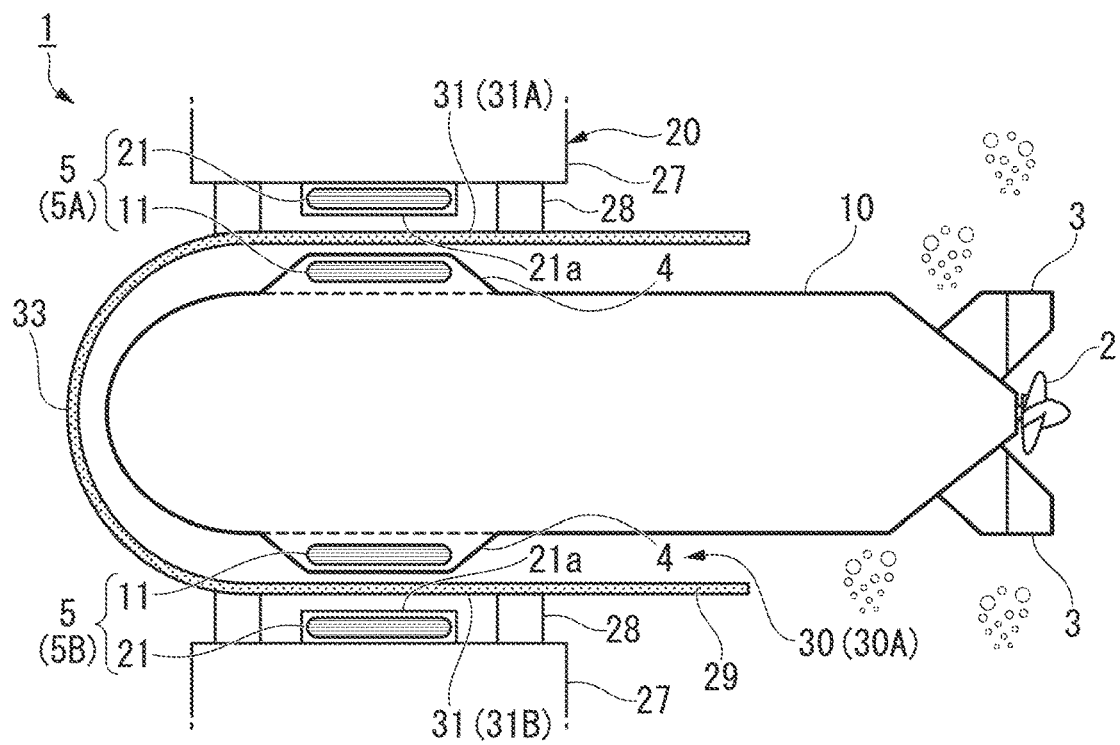
FIG. 3 is a diagram showing a wireless power supply system according to a modified example of the first embodiment of the present disclosure when viewed from a lateral side of an underwater mobile object.
Figure 4:
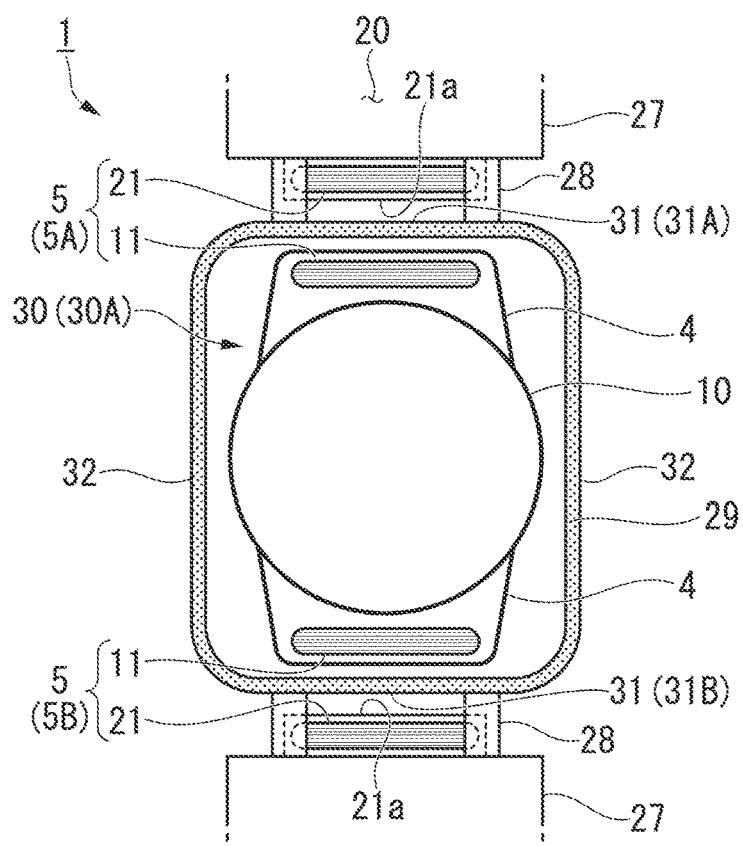
FIG. 4 is a diagram showing a wireless power supply system according to a modified example of the first embodiment of the present disclosure when viewed from a front side of an underwater mobile object.

(1) FIG. 3 is a diagram showing a wireless power supply system 1 according to a modified example of the first embodiment of the present disclosure when viewed from a lateral side of the underwater mobile object 10. FIG. 4 is a diagram showing the wireless power supply system 1 according to the modified example of the first embodiment of the present disclosure when viewed from a front side of the underwater mobile object 10.

In this modified example, as shown in FIG. 3, the platform 20 is provided with a recessed section 30A that can accommodate at least a part of the underwater mobile object 10 with a gap. The recessed section 30A is formed of a basket member 29. The platform 20 includes a power-transmitting coil support 27 that supports the power-transmitting coil 21 and a basket member support 28 that is disposed to protrude from the power-transmitting coil support 27 and supports the basket member 29. The power-transmitting coil 21 is sealed with a nonmagnetic and nonconductive resin member 21a (for example, an epoxy resin) that transmits the electromagnetic field used for wireless power supply and has water resistance and pressure resistance.

Parts of the basket member 29 facing the top and the bottom of the underwater mobile object 10 correspond to the wall portions 31, parts facing the right and left sides of the underwater mobile object 10 correspond to the wall portions 32, and a part facing the head of the underwater mobile object 10 corresponds to the wall portion 33.

The basket member support 28 is configured to support the wall portions 31 of the recessed section 30A vertically facing each other. The basket member support 28 is disposed to be separated from the power-transmitting coil 21 so as not to affect the electromagnetic field generated in the wireless power supply. The basket member support 28 is formed of, for example, concrete or steel. When the basket member support 28 is formed of a nonmagnetic and nonconductive material transmitting the electromagnetic field used for the wireless power supply like the basket member 29, the basket member support may be disposed in the vicinity of the power-transmitting coil 21.

As shown in FIG. 3, the basket member 29 has a substantially U-shaped cross-section. As shown in FIG. 4, the basket member 29 is opened in a substantially rectangular shape. The basket member 29 is constituted by interlacing or knitting strings or tapes, which are formed of a nonmagnetic and nonconductive material (such as fiber-reinforced plastics) transmitting the electromagnetic field used for the wireless power supply, in a net shape and has resilience.

According to this modified example, the recessed section 30A is formed of the basket member 29 and has resilience. Accordingly, even when the underwater mobile object 10 moves due to a water current or the like and comes in contact with the basket member 29, that is, the wall portions 31, 32, and 33, it is possible to prevent the underwater mobile object from being damaged. In this modified example, since the distance between the power-receiving coil 11 and the power-transmitting coil 21 of the first coil pair 5A and the distance between the power-receiving coil 11 and the power-transmitting coil 21 of the second coil pair 5B have a relationship that one distance decreases when the other distance increases, it is possible to achieve the aforementioned operational advantages.

Figure 5:
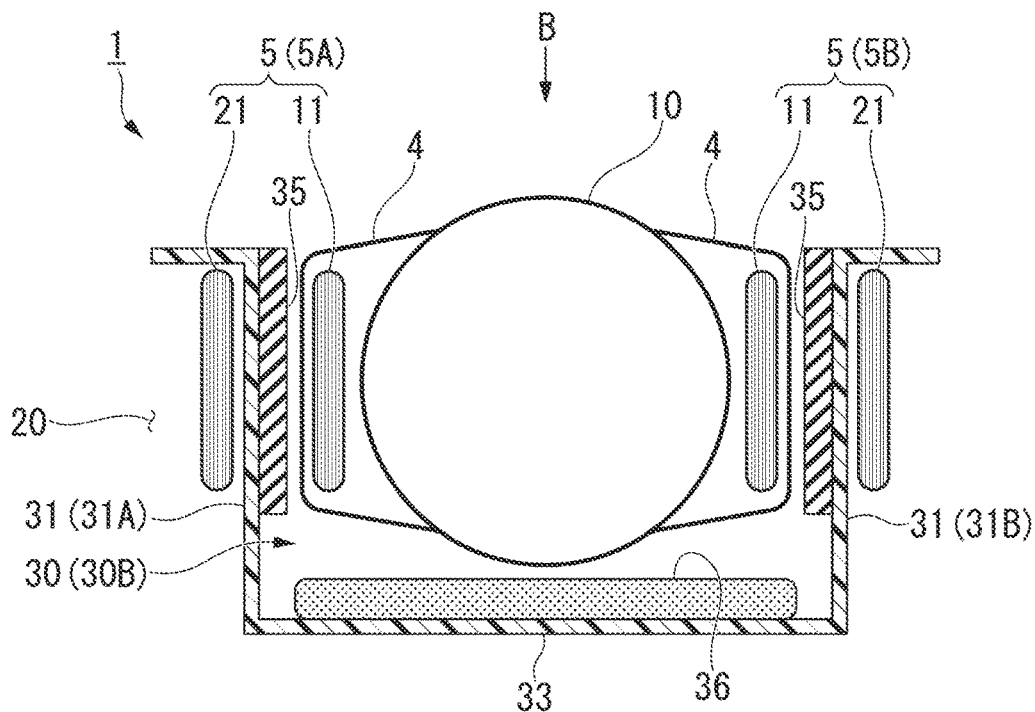
FIG. 5 is a diagram showing a wireless power supply system according to a modified example of the first embodiment of the present disclosure when viewed from a front side of an underwater mobile object.
Figure 6:
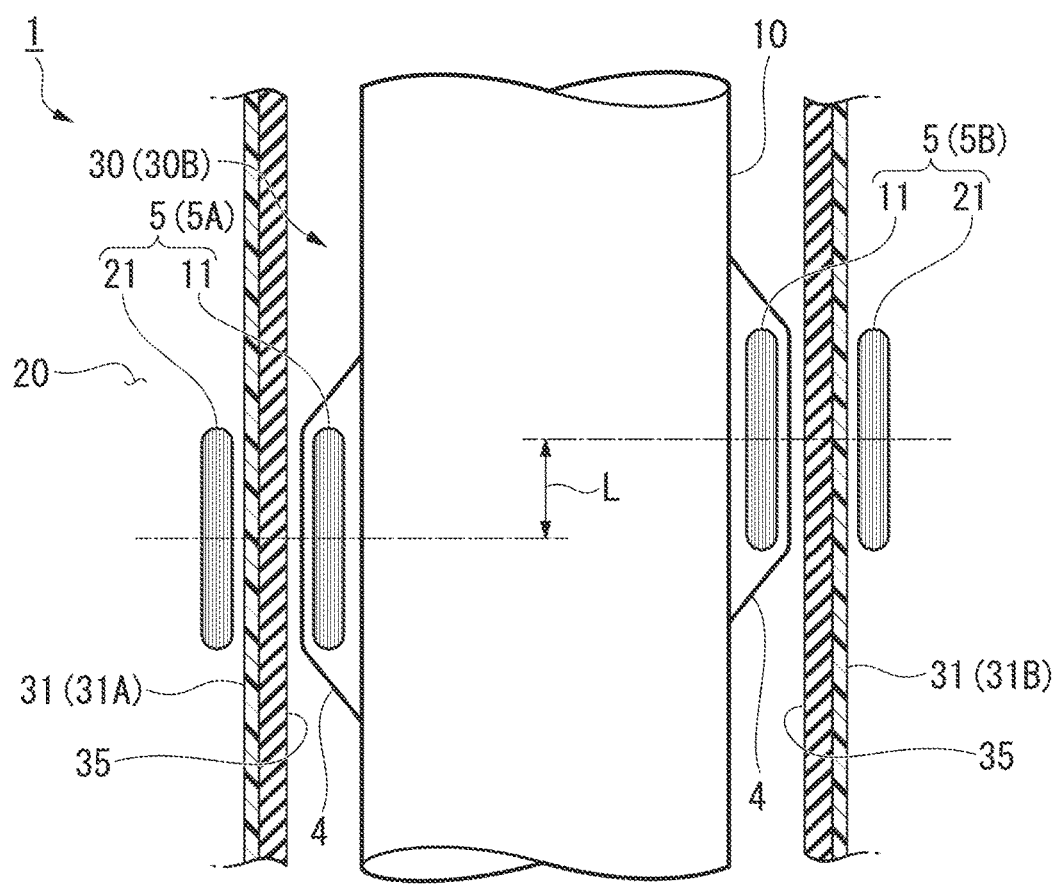
FIG. 6 is a diagram taken along arrow B in FIG. 5.

(2) FIG. 5 is a diagram showing a wireless power supply system 1 according to one modified example of the first embodiment of the present disclosure when viewed from the front side of the underwater mobile object 10. FIG. 6 is a diagram taken along arrow B in FIG. 5. In this modified example, as shown in FIG. 5, the power-receiving coil 11 is disposed on one side of the underwater mobile object 10 and the wireless power supply is received from the side. A recessed section 30B disposed in the platform 20 is opened upward and has a groove shape extending linearly. The power-transmitting coil 21 is disposed in the back of each of the wall portions 31 of the recessed section 30B facing each other laterally. The first coil pair 5A disposed to be opposable on one (the wall portion 31A side) of the wall portions 31 of the recessed section 30B facing each other and the second coil pair disposed to be opposable on the other (the wall portion 31B side) of the wall portions 31 of the recessed section 30B facing each other may not be arranged coaxially, and an example in which the first coil pair 5A and the second coil pair 5B are formed to be deviated by a distance L in the extending direction of the recessed section 30B is shown in FIG. 6.

In this modified example, since the distance between the power-receiving coil 11 and the power-transmitting coil 21 of the first coil pair 5A and the distance between the power-receiving coil 11 and the power-transmitting coil 21 of the second coil pair 5B have a relationship that one distance decreases when the other distance increases, it is possible to achieve the aforementioned operational advantages.

Since power is supplied from the lateral sides and the relative position variation in the horizontal direction can be allowed, this modified example can be suitably applied to a water mobile object.

Figure 7:
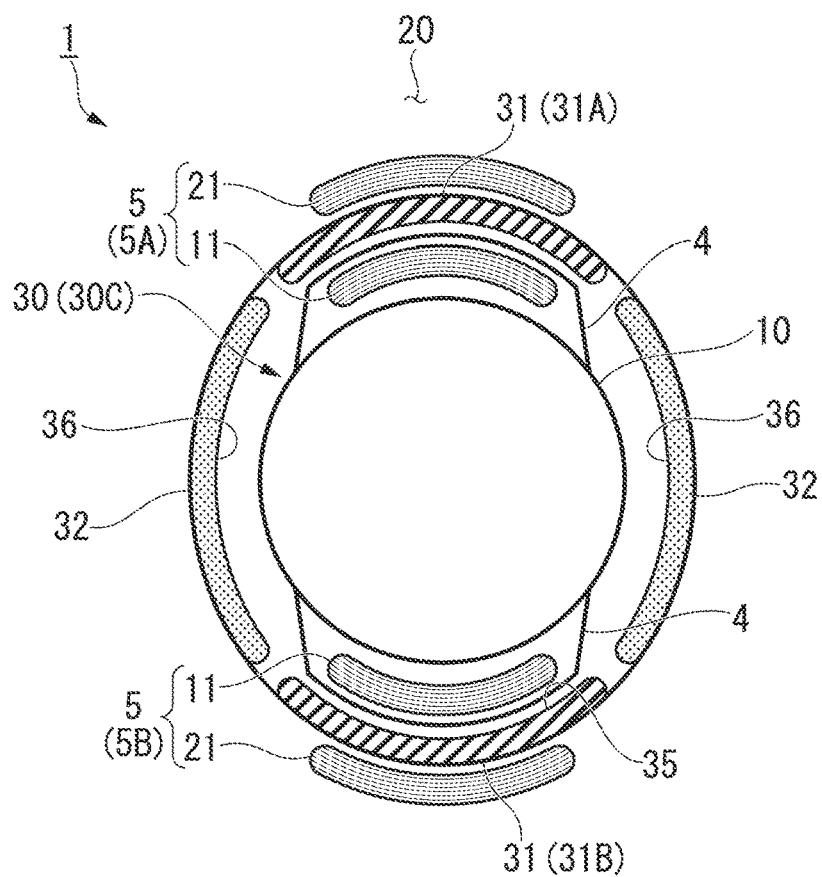
FIG. 7 is a diagram showing a wireless power supply system according to a modified example of the first embodiment of the present disclosure when viewed from a front side of an underwater mobile object.

(3) FIG. 7 is a diagram showing a wireless power supply system 1 according to one modified example of the first embodiment of the present disclosure when viewed from the front side of the underwater mobile object 10.

In this modified example, as shown in FIG. 7, the platform 20 is provided with a recessed section 30C that is opened in an elliptical shape (a substantially elliptical shape). The power-transmitting coil 21 is disposed in the back of each of the wall portions 31 of the recessed section 30C vertically facing each other. The power-transmitting coil 21 is curved in a concave shape along the curved shape of the wall portions 31. On the other hand, the power-receiving coil 11 is curved in a convex shape along the curved shape of the wall portion 31.

In this modified example, since the distance between the power-receiving coil 11 and the power-transmitting coil 21 of the first coil pair 5A and the distance between the power-receiving coil 11 and the power-transmitting coil 21 of the second coil pair 5B have a relationship that one distance decreases when the other distance increases, it is possible to achieve the aforementioned operational advantages.

The distance between the power-transmitting coil 21 and the power-receiving coil 11 increases but the power-transmitting coil 21 or the power-receiving coil 11 is not curved but planar, or a plurality of small planar coils may be combined into a bent cross-sectional shape.

(4) Similarly to a second embodiment to be described below and a modified example thereof, the power-transmitting coil 21s may be disposed on the front and back of a plate-like coil support rising upright or the power-transmitting coils 21 may be disposed inside opposing surfaces of a hollow coil support.

Second Embodiment

A second embodiment of the present disclosure will be described below. In the following description, elements identical or similar to those of the aforementioned embodiment will be provided with the same reference signs and a description thereof will be made in brief or will not be repeated.

Figure 8:
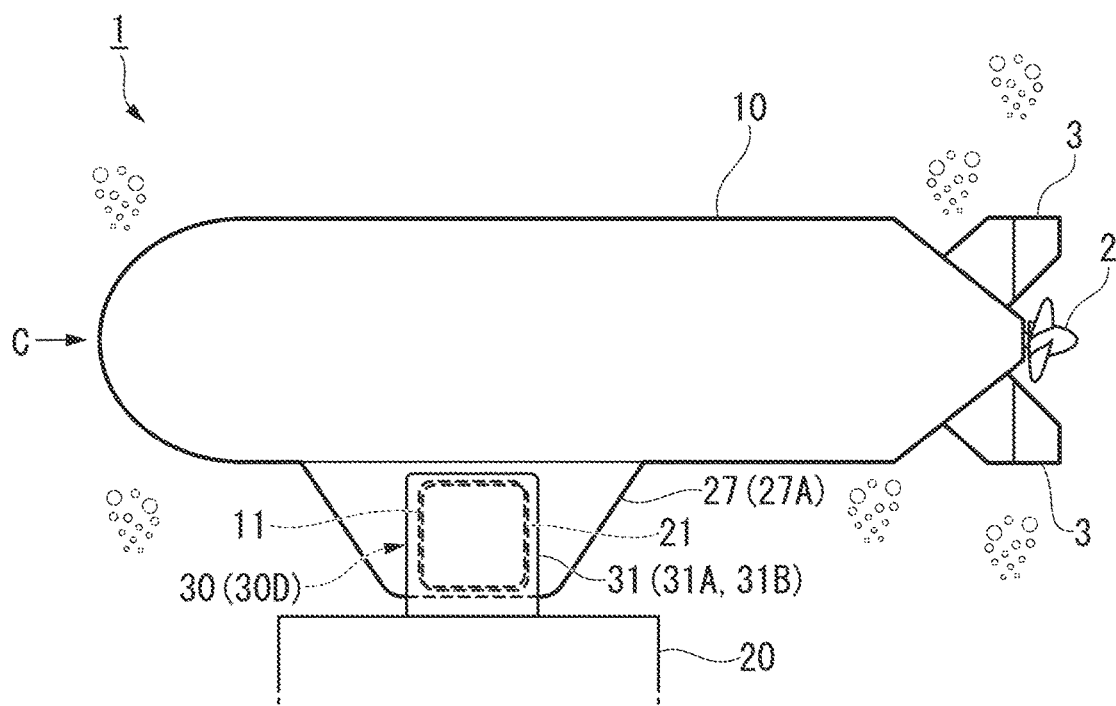
FIG. 8 is a diagram showing a wireless power supply system according to a modified example of the first embodiment of the present disclosure when viewed from a lateral side of an underwater mobile object.
Figure 9:
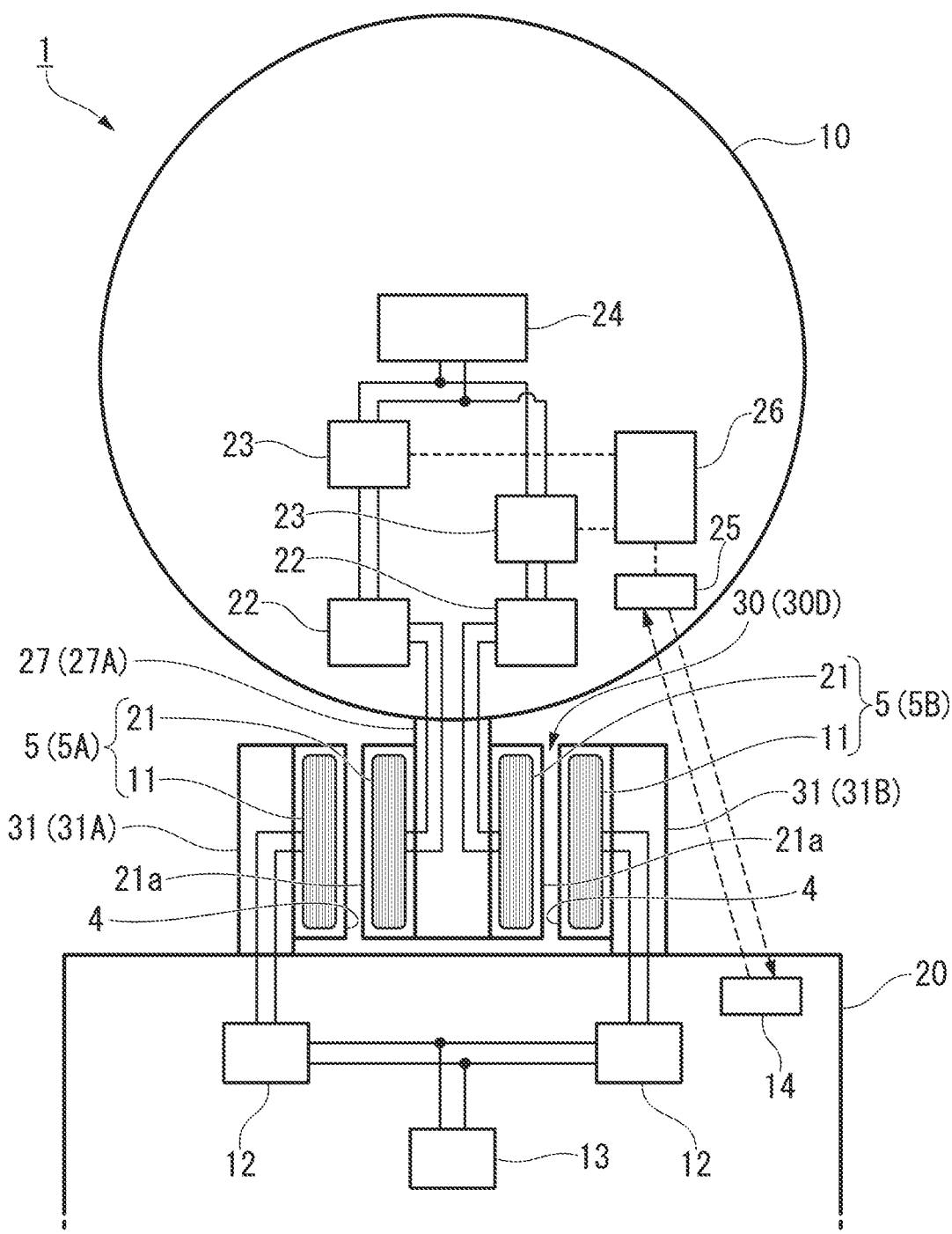
FIG. 9 is a diagram taken along arrow C in FIG. 8 and a diagram showing the entire configuration of a wireless power supply system according to a second embodiment of the present disclosure.

FIG. 8 is a diagram showing a wireless power supply system 1 according to the second embodiment of the present disclosure when viewed from the lateral side of an underwater mobile object 10. FIG. 9 is a diagram taken along arrow C in FIG. 8 and is a diagram showing the entire configuration of the wireless power supply system according to the second embodiment of the present disclosure. In this embodiment, as shown in FIG. 9, the underwater mobile object 10 functions as a power-transmitting device and a platform 20 disposed underwater functions as a power-receiving device. The underwater mobile object 10 is configured to move relative to the platform 20.

In order to control a navigation speed or a navigation direction, the underwater mobile object 10 is an autonomous unmanned underwater vehicle that can tracklessly navigate in water and may have mission equipment (not shown) for undersea search mounted thereon, similar to the first embodiment. The underwater mobile object 10 includes, for example, a main thruster 2 in the rear part, rudders 3 (upper and lower rudder fins) on the upper and lower sides of the rear part, and a vertical thruster (not shown) and a horizontal thruster (not shown) in the front part. The control method of the underwater mobile object 10 is the same as described in the first embodiment and thus a description thereof will not be repeated here.

The underwater mobile object 10 includes a power-transmitting coil 21 as shown in FIGS. 8 and 9. The power-transmitting coil 21 is disposed on each of the front and back sides of a plate-like power-transmitting coil support 27A which rises upright from the bottom of the underwater mobile object 10. The power-transmitting coil 21 is sealed with a nonmagnetic and nonconductive resin member 21a (for example, an epoxy resin) transmitting an electromagnetic field which is used for wireless power supply and has water resistance and pressure resistance. The resin member 21a has a surface that is smoothly shaped so as to reduce flow resistance disturbing navigation.

The underwater mobile object 10 additionally includes a transmitting-side DC-AC conversion circuit 22, a transmitting-side power conversion circuit 23, a power source 24, a communication device 25, and a controller 26.

The configurations of the transmitting-side DC-AC conversion circuit 22 and the transmitting-side power conversion circuit 23 are the same as in the first embodiment and thus a description thereof will not be repeated here.

The power source 24 is a secondary battery that can store power required for fully charging a load 13 (a power storage device) (to be described later) of the platform 20 and is, for example, a lithium ion secondary battery, a nickel-hydrogen secondary battery, or an electric double-layer capacitor with a large capacity. The power source 24 may or may not also function as a driving power source of the underwater mobile object 10.

The communication device 25 functions to communicate with the platform 20. The communication device 25 and a communication device 14 (to be described later) may perform acoustic positioning using ultrasonic waves to measure a position of the underwater mobile object 10 in water. An inertial navigation method may be employed as the underwater positioning or may be used together with the acoustic positioning in order to enhance navigation accuracy. The positioning method is the same as described in the first embodiment and description thereof will not be repeated.

The controller 26 is connected to the communication device 25, operates the transmitting-side power conversion circuit 23 after confirming that at least a part (the power-transmitting coil support 27A) of the underwater mobile object 10 (the body) is accommodated in a recessed section 30D (to be described later), and causes the underwater mobile object 10 and the platform 20 to perform wireless power supply using a first coil pair 5A (to be described later) a second coil pair 5B (to be described later) which are disposed to be opposable. The controller 26 controls power supplied to the first coil pair 5A and the second coil pair 5B on the basis of the power supply efficiency of the first coil pair 5A and the second coil pair 5B.

Specifically, the controller 26 acquires power (Pr_1: a measured value) which is received by the receiving-side power conversion circuit 12 (to be described later) connected to the power-receiving coil 11 (to be described later) forming the first coil pair 5A, power (Pr_2: a measured value) which is received by the receiving-side power conversion circuit 12 (to be described later) connected to the power-receiving coil 11 (to be described later) forming the second coil pair 5B, and power (Pbatt: an output value from a battery controller (not shown)) required for charging the load 13 (to be described later) using the communication device 25 and the communication device 14 from the underwater mobile object 10 and the platform 20. The method of measuring power is the same as described in the first embodiment and thus description thereof will not be repeated.

The controller 26 acquires power (Ps_1: a measured value) which is supplied from the transmitting-side power conversion circuit 23 connected to the power-transmitting coil 21 forming the first coil pair 5A via the transmitting-side DC-AC conversion circuit 22 and power (Ps_2: a measured value) which is supplied from the transmitting-side power conversion circuit 23 connected to the power-transmitting coil 21 forming the second coil pair 5B via the transmitting-side DC-AC conversion circuit 22. The method of measuring power is the same as described in the first embodiment and thus description thereof will not be repeated. Ps_1, Pr_1, Ps_2, Pr_2, and Pbatt are values that vary with the lapse of time.

The operation of the controller 26, the method of determining power supply efficiency, and the method of changing a power command value are the same as described in the first embodiment.

The platform 20 is disposed, for example, on a sea bottom and includes instruments (not shown) that measure and record a temperature or vibration of the sea bottom. The platform 20 is provided with a power storage device that can store sufficient power as a power source for driving the instruments as a load 13.

The state of charge of the power storage device decreases by supplying power to the instruments, but the instruments mounted on the platform 20 can be made to continuously operate by causing the underwater mobile object 10 to approach the platform 20, supplying power to the power storage device from the underwater mobile object 10 by wireless power supply to charge the power storage device, and fully charging the power storage device (to be described later). The specific configuration of the power storage device is the same as described in the first embodiment.

The platform 20 includes the power-receiving coil 11 as shown in FIGS. 8 and 9. The platform 20 includes a recessed section 30D that can accommodate at least a part (the power-transmitting coil support 27A) of the underwater mobile object 10 with a gap, and the power-receiving coil 11 is disposed inside each of the wall portions 31 of the recessed section 30D facing each other laterally. The power-receiving coil 11 is disposed in the back of a cover member 4 which has satisfactory water resistance and pressure resistance and which is formed of a nonmagnetic and nonconductive material (such as plastics or fiber-reinforced plastics) transmitting an electromagnetic field used for the wireless power supply.

The power-receiving coil 11 (the first coil of the power-receiving device) and the power-transmitting coil 21 (the first coil of the power-transmitting device) which are disposed to be opposable on one (the wall portion 31A side) of the wall portions 31 of the recessed section 30D facing each other constitute the first coil pair 5A. The power-receiving coil 11 (the second coil of the power-receiving device) and the power-transmitting coil 21 (the second coil of the power-transmitting device) which are disposed to be opposable on the other (the wall portion 31B side) of the wall portions 31 of the recessed section 30D facing each other constitute the second coil pair 5B.

The shape, size, and system of the power-receiving coil 11 or the power-transmitting coil 21 and the configuration of the wireless power supply based on a magnetic resonance system are the same as described in the first embodiment and thus a description thereof will not be repeated here.

In addition, the platform 20 is provided with the receiving-side power conversion circuit 12 and the communication device 14. The receiving-side power conversion circuit 12 is the same as in the first embodiment and thus description thereof will not be repeated. The communication device 14 communicates with the communication device 25 disposed in the underwater mobile object 10. The configuration of the communication device 14 is the same as in the first embodiment and thus description thereof will not be repeated.

The power supply operation of the wireless power supply system 1 according to the second embodiment having the aforementioned configuration will be described below.

As shown in FIGS. 8 and 9, the wireless power supply system 1 performs wireless power supply from the underwater mobile object 10 that has approached the platform 20. The underwater mobile object 10 determines whether to approach the platform 20 on the basis of the state of charge of the load 13, and grasps its current position by communication between the communication devices 14 and 25 and approaches the platform 20 when it is determined that the underwater mobile object should approach the platform. The underwater mobile object 10 having approached the platform 20 enters the recessed section 30D such that at least a part of the underwater mobile object 10 is accommodated in the recessed section, and performs the supply of power.

In the second embodiment, since the distance between the power-receiving coil 11 and the power-transmitting coil 21 of the first coil pair 5A and the distance between the power-receiving coil 11 and the power-transmitting coil 21 of the second coil pair 5B have a relationship that one distance decreases when the other distance increases, it is possible to achieve the same operational advantages as in the first embodiment by the same operations as in the first embodiment.

The electromagnetic field for the wireless power supply generated between the power-transmitting coil 21 and the power-receiving coil 11 passes through the resin member 21a and the cover member 4. However, these constituents are formed of a nonmagnetic and nonconductive material and thus do not affect the electromagnetic field and does not decrease the power supply efficiency.

In the second embodiment, similar to the first embodiment and the modified examples thereof, the recessed section may have various shapes and various arrangements.

The second embodiment is not limited to the aforementioned configuration and can employ, for example, modified examples described below.

Figure 10:
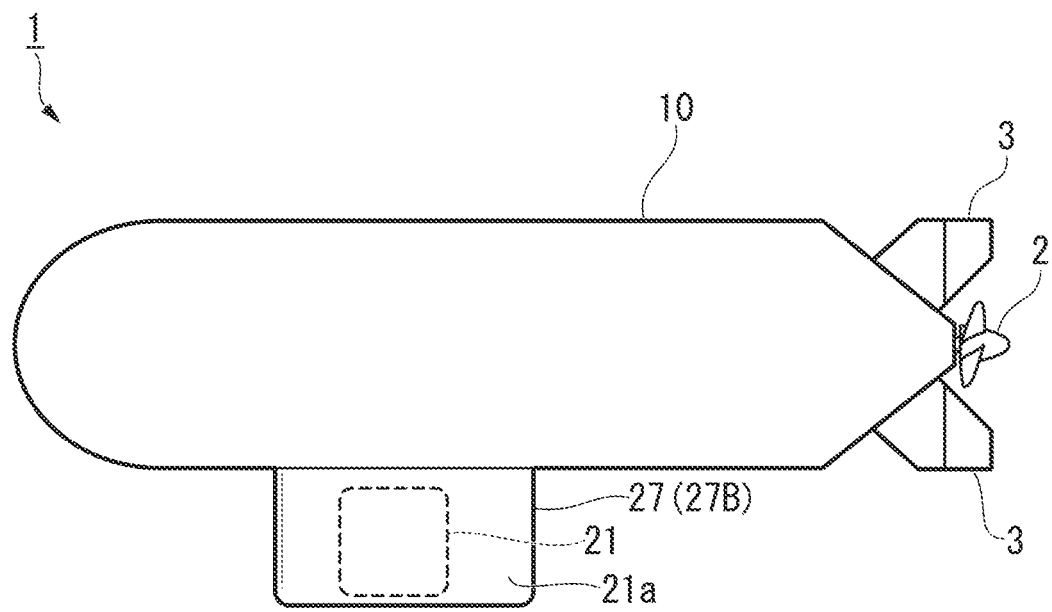
FIG. 10 is a diagram showing a power-transmitting coil support and a power-transmitting coil in a wireless power supply system according to a modified example of the second embodiment of the present disclosure when viewed from a lateral side of an underwater mobile object.
Figure 11:
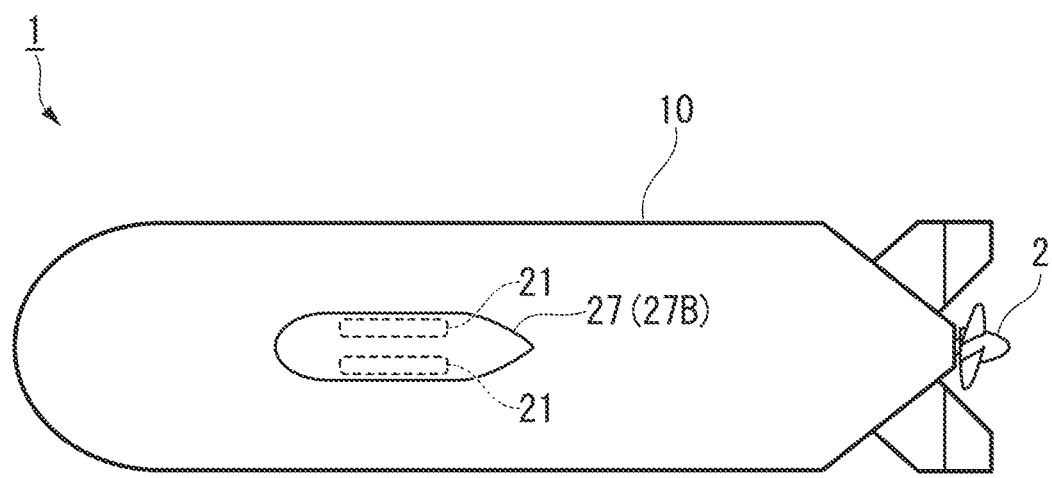
FIG. 11 is a diagram showing a power-transmitting coil support and a power-transmitting coil in a wireless power supply system according to a modified example of the second embodiment of the present disclosure when viewed from a bottom side of an underwater mobile object.

FIG. 10 is a diagram showing a power-transmitting coil support 27B and a power-transmitting coil 21 of a wireless power supply system 1 according to one modified example of the second embodiment of the present disclosure when viewed from the lateral side of the underwater mobile object 10. FIG. 11 is a diagram showing the power-transmitting coil support 27B and the power-transmitting coil 21 of the wireless power supply system 1 according to the modified example of the second embodiment of the present disclosure when viewed from the bottom side of the underwater mobile object 10.

In this modified example, the power-transmitting coil support 27B is hollow and the power-transmitting coils 21 are disposed inside the laterally opposing surfaces thereof. The outer surface of the power-transmitting coil support 27B has a streamlined shape to reduce flow resistance that disturbs navigation when the underwater mobile object 10 moves in water. The power-transmitting coil support 27B has water resistance and pressure resistance and an area through which the magnetic field for the wireless power supply generated in the power-transmitting coil 21 passes is formed of a nonmagnetic and nonconductive material, for example, a resin, transmitting the electromagnetic field used for the wireless power supply. That is, the power-transmitting coil support 27B also functions as the resin member 21a. The other parts of the underwater mobile object 10 and the platform 20 are the same as shown in FIGS. 8 and 9.

In this modified example, since the distance between the power-receiving coil 11 and the power-transmitting coil 21 of the first coil pair 5A and the distance between the power-receiving coil 11 and the power-transmitting coil 21 of the second coil pair 5B have a relationship that one distance decreases when the other distance increases, it is possible to achieve the same operational advantages as described above.

Third Embodiment

A third embodiment of the present disclosure will be described below. In the following description, elements identical or similar to those of the aforementioned embodiments will be identified by the same reference signs and a description thereof will be made in brief or will not be repeated here.

Figure 12:
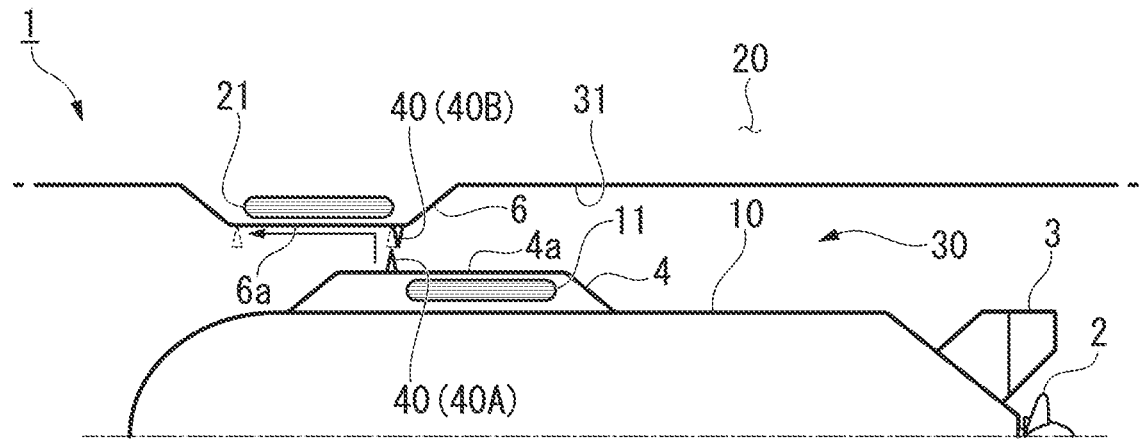
FIG. 12 is a diagram showing a partial configuration of a wireless power supply system according to a third embodiment of the present disclosure.
Figure 13:
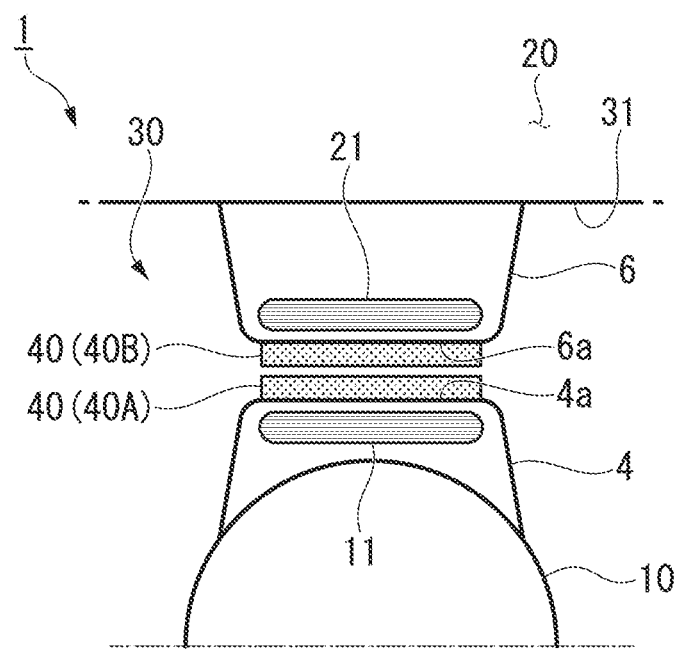
FIG. 13 is a diagram showing the wireless power supply system according to the third embodiment of the present disclosure when viewed from a front side of an underwater mobile object.

FIG. 12 is a diagram showing the entire configuration of a wireless power supply system 1 according to the third embodiment of the present disclosure. FIG. 13 is a diagram showing the wireless power supply system 1 according to the third embodiment of the present disclosure when viewed from the front side of an underwater mobile object 10.

As shown in FIG. 12, the third embodiment is different from the aforementioned embodiments, in that the platform 20 has a different configuration and a scraper member 40 is provided.

In the platform 20 according to the third embodiment, the power-transmitting coil 21 is disposed in the back of a cover member 6 that has satisfactory water resistance and pressure resistance and that is formed of a nonmagnetic and nonconductive material (such as plastics or fiber-reinforced plastics) transmitting an electromagnetic field used for the wireless power supply. The cover member 6 is disposed to protrude from a wall portion 31 of a recessed section 30 disposed in the platform 20. In the cover member 6, an opposing surface 6a covering a front direction of the power-transmitting coil 21 (a downward direction in FIG. 12) is formed planar. In a cover member 4 disposed in the underwater mobile object 1, an opposing surface 4a covering a front direction of the power-receiving coil 11 (an upward direction in FIG. 12) is formed planar. The power-receiving coil 11 and the power-transmitting coil 21 may not be surrounded with the cover member 4 and the cover member 6, but may be sealed with a nonmagnetic and nonconductive resin material not disturbing the electromagnetic field for the wireless power supply to form an outer shape of a resin mold having water resistance and pressure resistance.

The scraper member 40 drives away foreign materials which are present between the power-receiving coil 11 and the power-transmitting coil 21 (between the coil pair 5), particularly, foreign materials attached to the cover members 4 and 6, with the relative movement of the underwater mobile object 10 and the platform 20. In water, living things, sludge, or the like may be attached as foreign materials to the cover members 4 and 6, metal as a foreign material may be included in waste discarded in the water, and metal may be attached to the cover members 4 and 6 by sludge. The scraper member 40 is disposed to drive away the foreign materials. The wireless power supply system 1 according to the third embodiment includes a scraper member 40A disposed in the underwater mobile object 10 and a scraper member 40B disposed in the platform 20.

The scraper member 40A is disposed to protrude from the opposing surface 4a of the cover member 4. The scraper member 40A is disposed in front of the power-receiving coil 11 in the entering direction of the underwater mobile object 10 into the recessed section 30. On the other hand, the scraper member 40B is disposed to protrude from the opposing surface 6a of the cover member 6 to the same height as the scraper member 40A. The scraper member 40B is disposed in back of the power-transmitting coil 21 in the entering direction of the underwater mobile object 10 into the recessed section 30.

The scraper members 40 are formed in a rod shape having a triangular cross-sectional shape. The scraper members 40 are preferably formed of a nonmagnetic and nonconductive material (such as plastics, fiber-reinforced plastics, or rubber) having flexibility such that a tip thereof does not damage the other party (the cover members 4 and 6) in spite of rubbing the other party. The scraper members 40 may be formed of a metal material as long as it can be located at a position not disturbing the electromagnetic field for the wireless power supply.

The operation before the supply of power of the wireless power supply system 1 having the aforementioned configuration will be described below.

In water, living things (such as shellfish), sludge, or the like as foreign materials may be attached to the opposing surface 4a of the cover member 4 or the opposing surface 6a of the cover member 6, metal (an empty can or the like) as a foreign material may float in waste discarded in the water, and metal may be attached to the opposing surface 4a of the cover member 4 or the opposing surface 6a of the cover member 6 by sludge. When foreign materials are attached to the opposing surface 4a of the cover member 4 or the opposing surface 6a of the cover member 6, the power-receiving coil 11 and the power-transmitting coil 21 are separated from each other by the foreign materials and thus there is a possibility of a decrease in power supply efficiency or a power supply failure. When a metal foreign material floats or is attached to the opposing surface 4a of the cover member 4 or the opposing surface 6a of the cover member 6, the electromagnetic field for the wireless power supply is disturbed.

Accordingly, the wireless power supply system 1 according to the third embodiment includes the scraper member 40 that drives away foreign materials present between the power-receiving coil 11 and the power-transmitting coil 21 with the relative movement of the underwater mobile object 10 and the platform 20. According to this configuration, by moving the underwater mobile object 10 vertically or laterally, causing the scraper member 40A to press the opposing surface 6a of the cover member 6, causing the scraper member 40B to press the opposing surface 4a of the cover member 4, and causing the underwater mobile object 10 to go ahead with the pressed states maintained, it is possible to drive away the foreign materials present between the power-receiving coil 11 and the power-transmitting coil 21. In this case, the moving (navigation) locus of the underwater mobile object 10 is the same as indicated by an arrow in FIG. 12.

Specifically, the underwater mobile object 10 moves to an initial position for supply of power (a side in which the scraper member 40A passes through the scraper member 40B) in the recessed section 30 by external induction by the communication devices 14 and 25 or autonomous movement. Then, the underwater mobile object 10 sets its buoyant force to rise (for example, the buoyant force is set in advance to discard a ballast of the underwater mobile object 10, to eliminate ballast water in the underwater mobile object 10 with compressed air, and to cause the underwater mobile object 10 to rise) or rises by driving of the vertical thruster. When the underwater mobile object 10 rises, the scraper member 40A is pressed against the opposing surface 6a of the cover member 6 and the scraper member 40B is pressed against the opposing surface 4a of the cover member 4.

Then, the underwater mobile object 10 goes ahead to a position (a position at which the wireless power supply is possible) at which the power-receiving coil 11 and the power-transmitting coil 21 face each other. At this time, the scraper member 40A removes the foreign materials on the opposing surface 6a of the cover member 6 and the scraper member 40B removes the foreign materials on the opposing surface 4a of the cover member 4. Thereafter, the wireless power supply is performed, and the underwater mobile object 10 sets its buoyant force to go down (introduction of the ballast water or the like) or goes down by driving the vertical thruster when the wireless power supply ends. When the underwater mobile object 10 goes down to a position at which the scraper member 40A and the scraper member 40B do not come in contact with each other, the underwater mobile object is separated from the platform 20.

As described above, according to the third embodiment, since the foreign material present between the power-receiving coil 11 and the power-transmitting coil 21 can be driven away, it is possible to prevent a decrease in power supply efficiency of the wireless power supply or power supply failure. According to the third embodiment, since the foreign materials can be removed using the moving function which is an original function of the underwater mobile object 10, it is not necessary to provide a movable foreign material removing mechanism of which maintenance is difficult underwater and it is possible to realize removal of foreign materials of which maintenance is simple.

The third embodiment is not limited to the above-mentioned configuration and can employ, for example, modified examples described below in (1) to (3).

Figure 14:
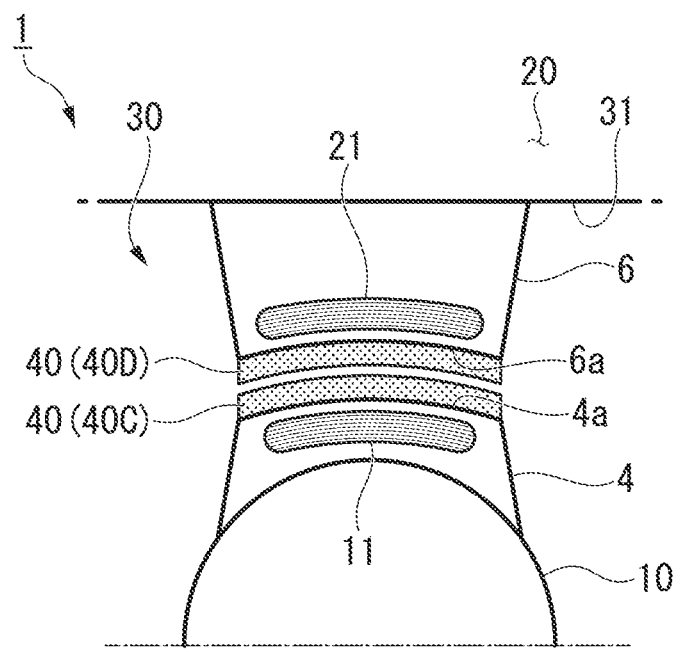
FIG. 14 is a diagram showing a wireless power supply system according to a modified example of the third embodiment of the present disclosure when viewed from a front side of an underwater mobile object.
Figure 15:
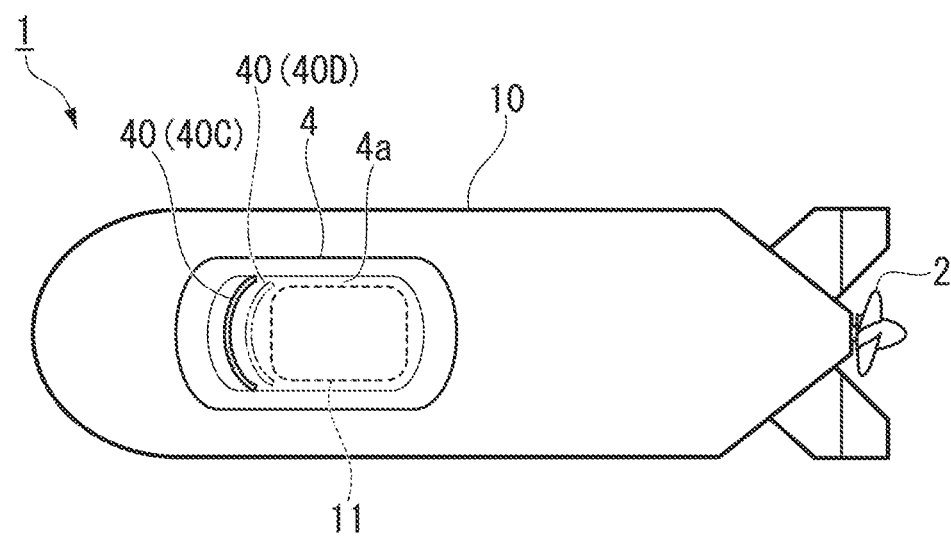
FIG. 15 is a top view of an underwater mobile object according to a modified example of the third embodiment of the present disclosure.

(1) FIG. 14 is a diagram showing a wireless power supply system 1 according to one modified example of the third embodiment of the present disclosure when viewed from the front side of the underwater mobile object 10. FIG. 15 is a top view of the underwater mobile object 10 according to the modified example of the third embodiment of the present disclosure.

In this modified example, as shown in FIG. 14, a scraper member 40C disposed in the underwater mobile object 10 is curved in a convex shape in a front view. The opposing surface 4a of the cover member 4 provided with the scraper member 40C and the power-receiving coil 11 are also curved in a convex shape in a front view. On the other hand, a scraper member 40D disposed in the platform 20 is curved in a concave shape in a front view to correspond to the scraper member 40C. The opposing surface 6a of the cover member 6 provided with the scraper member 40D and the power-transmitting coil 21 are also curved in a concave shape in a front view. In this modified example, the opening of the recessed section 30 may have a circular shape or an elliptical shape instead of a rectangular shape (see FIG. 7).

In this embodiment, as shown in FIG. 15, the scraper member 40C disposed in the underwater mobile object 10 is curved in a convex shape to the front side in a plan view. On the other hand, the scraper member 40D disposed in the platform 20 is also curved in a convex shape to the front side in a plan view to correspond to the scraper member 40C.

According to this modified example, it is possible to reduce underwater resistance by the curved shape of the scraper member 40C when the underwater mobile object 10 moves in comparison with the underwater mobile object 10 including the aforementioned scraper member 40A.

Figure 16:
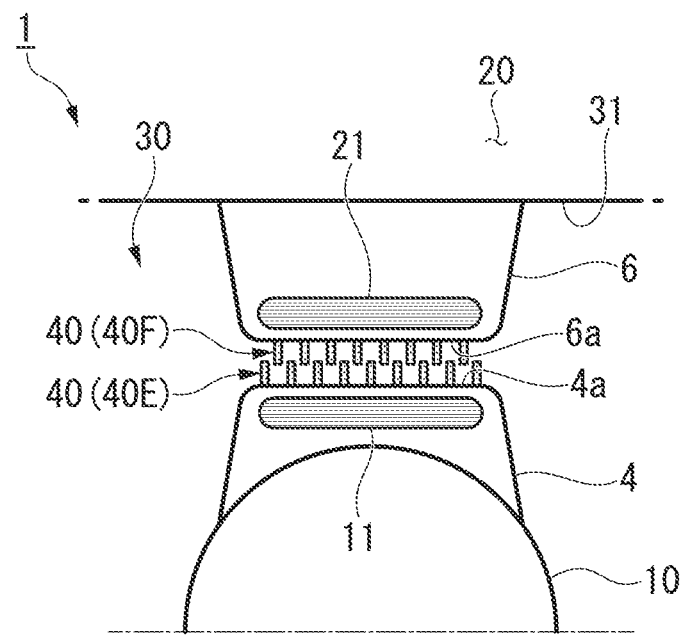
FIG. 16 is a diagram showing a wireless power supply system according to a modified example of the third embodiment of the present disclosure when viewed from a front side of an underwater mobile object.

(2) FIG. 16 is a diagram showing a wireless power supply system 1 according to one modified example of the third embodiment of the present disclosure when viewed from the front side of the underwater mobile object 10.

In this modified example, as shown in FIG. 16, a scraper member 40E disposed in the underwater mobile object 10 is formed in a shape of fins or in a brush shape in which fins are arranged at intervals in the width direction in a front view. On the other hand, a scraper member 40F disposed in the platform 20 is formed in a shape of fins or in a brush shape in which fins are arranged at intervals in the width direction with a positional relationship in which the fins are deviated from those of the scraper member 40E in a front view.

According to this modified example, it is possible to reduce underwater resistance by allowing water to pass through the gaps of the scraper member 40E when the underwater mobile object 10 moves in comparison with the underwater mobile object 10 include the aforementioned scraper member 40A.

Figure 17:
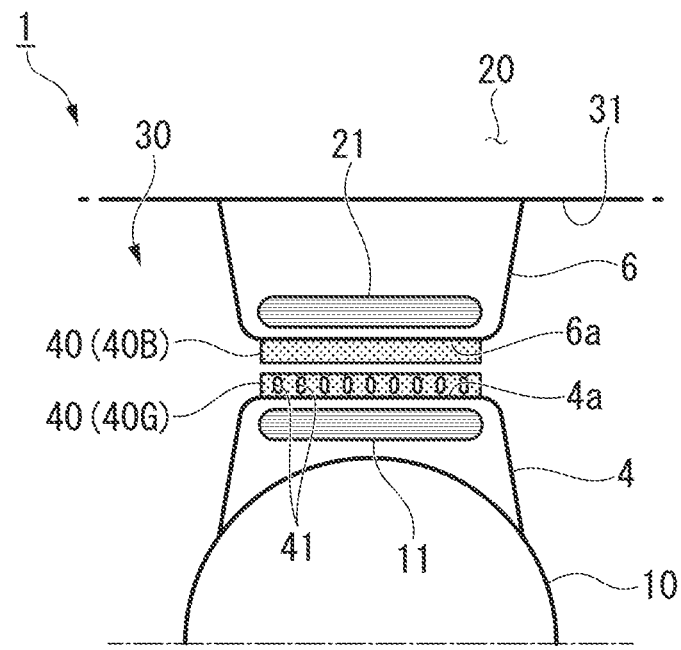
FIG. 17 is a diagram showing a wireless power supply system according to a modified example of the third embodiment of the present disclosure when viewed from a front side of an underwater mobile object.

(3) FIG. 17 is a diagram showing a wireless power supply system 1 according to one modified example of the third embodiment of the present disclosure when viewed from the front side of the underwater mobile object 10.

In this modified example, as shown in FIG. 17, a plurality of holes 41 are formed at intervals in the width direction in a scraper member 40G disposed in the underwater mobile object 10. The aforementioned scraper member 40B is disposed in the platform 20.

According to this modified example, it is possible to reduce underwater resistance by allowing water to pass through the holes 41 formed in the scraper member 40G when the underwater mobile object 10 moves in comparison with the underwater mobile object 10 include the aforementioned scraper member 40A.

Fourth Embodiment

Figure 18:
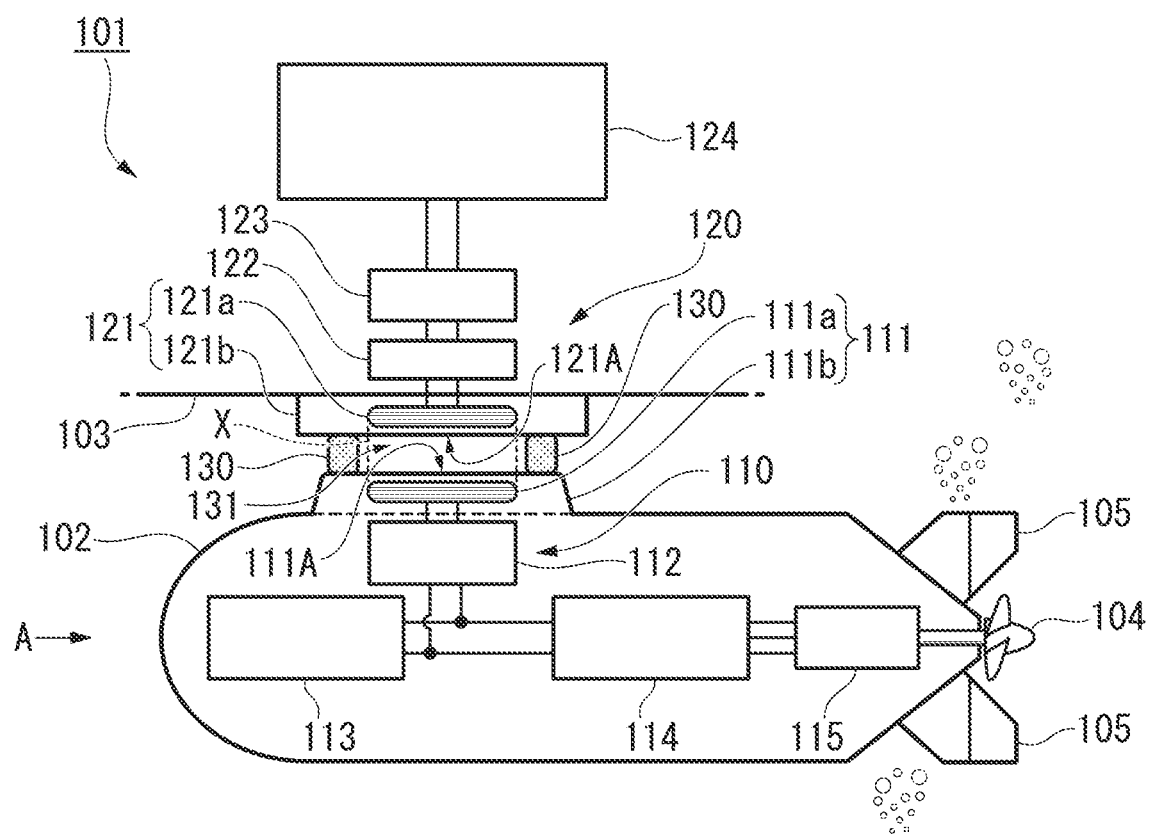
FIG. 18 is a diagram showing the entire configuration of a wireless power supply system according to a fourth embodiment of the present disclosure.
Figure 19:
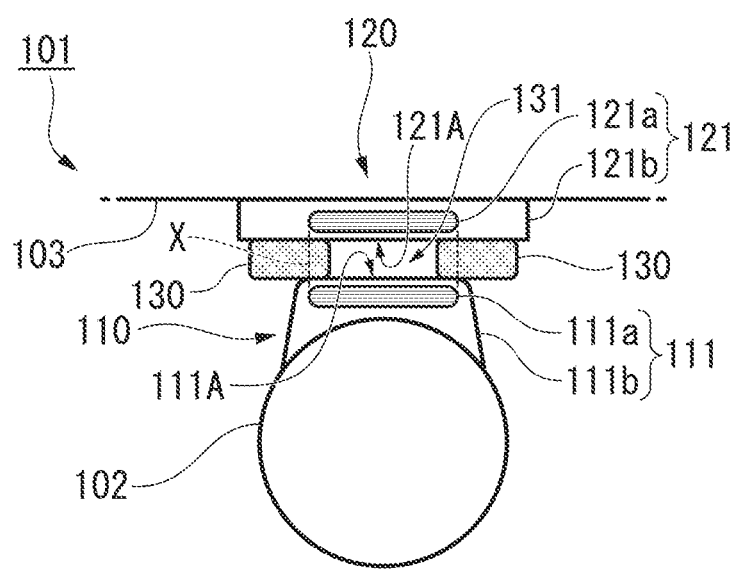
FIG. 19 is a diagram taken along arrow A in FIG. 18.
Figure 20:
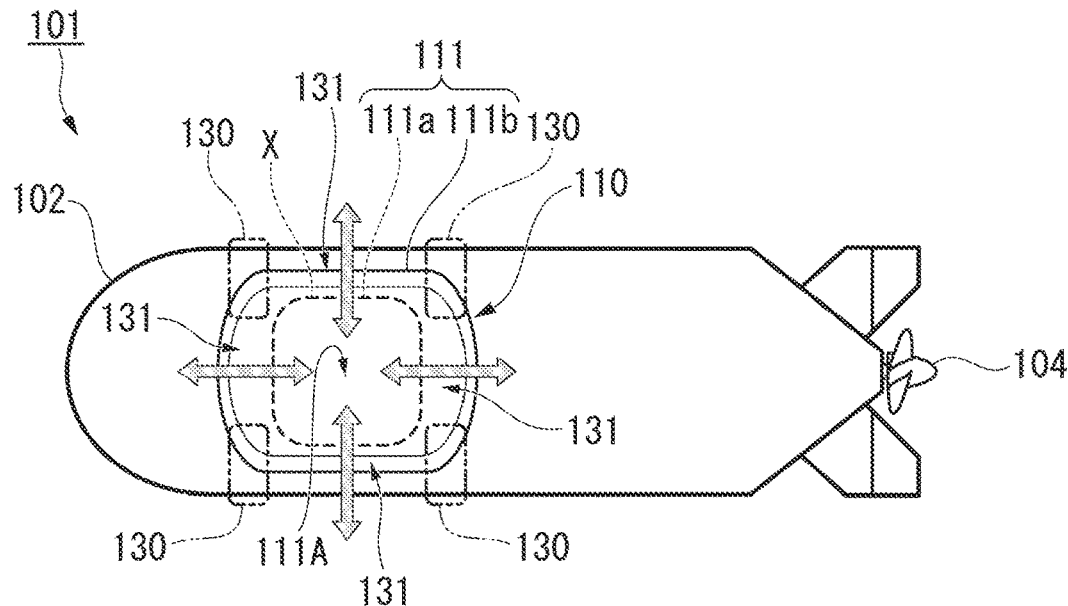
FIG. 20 is a top view of an underwater mobile object according to the fourth embodiment of the present disclosure.

FIG. 18 is a diagram showing the entire configuration of a wireless power supply system 101 according to a fourth embodiment of the present disclosure. FIG. 19 is a view along arrow A in FIG. 18. FIG. 20 is a top view of an underwater mobile object 102 according to the fourth embodiment of the present disclosure.

As shown in FIG. 18, the wireless power supply system 101 performs wireless power supply using a coil pair of a power-receiving coil 111*a* and a power-transmitting coil 121*a* between a power-receiving device 110 and a power-transmitting device 120.

In the wireless power supply system 101, at least one of the power-receiving device 110 and the power-transmitting device 120 is disposed in the underwater mobile object 102. In this embodiment, the power-receiving device 110 is disposed in the underwater mobile object 102. On the other hand, the power-transmitting device 120 is disposed in a platform 103 to which the underwater mobile object 102 is returned. The underwater mobile object 102 is configured to move relative to the platform 103.

The underwater mobile object 102 according to this embodiment is an autonomous unmanned underwater vehicle that can tracklessly navigate in water and has, for example, mission equipment for undersea search (not shown) mounted thereon. Examples of the mission equipment include a sonar device for inspecting the topography of a sea bottom or acquiring strata information under the sea bottom, a thermometer for measuring a temperature of seawater, and a sensor for measuring distribution information of specific chemicals in seawater from the amount of light absorbed.

In order to control a navigation speed or a navigation direction, the underwater mobile object 102 includes, for example, a main thruster 104 (thruster, liquid flow device) in the rear part, rudders 105 (upper and lower rudder fins) on the upper and lower sides of the rear part, elevators (right and left rudder fins (not shown)) on the right and left sides of the rear part, and a vertical thruster (not shown) and a horizontal thruster (not shown) in the front part. Speed control is performed by changing the rotating speed of the main thruster 104. Lateral angle control is performed by controlling the lateral angles of the rudders 105 as a rudder and the horizontal thruster is used together when the underwater mobile object turns with a smaller radius. Elevation angle control is performed by controlling the elevation angles of the right and left elevators as a rudder and the vertical thruster is used together when the underwater mobile object turns with a smaller radius.

The underwater mobile object 102 includes a communication device (not shown) and communicates with the platform 103. For example, the underwater mobile object also performs acoustic positioning using ultrasonic waves to position the underwater mobile object 102 in water. For example, an ultra-short base line (USBL) system can be employed as the acoustic positioning. In the USBL, the distance to a target (the underwater mobile object 102) can be determined from a round-trip time of sound waves and an underwater sound velocity, an angle can be determined from a phase difference of sound waves in a wave receiver array (an arrangement of a plurality of wave receivers) of the USBL, and the position of the target in a three-dimensional space relative to a USBL transceiver (wave transmitter and receiver) can be calculated.

In the platform 103 equipped with the transceiver, the latitude and longitude of the target is acquired by adding a position relative to the target to the position (longitude and latitude) of the transceiver in the terrestrial coordinate system and the attitude angle (the inclination from a horizontal line and the azimuth). By transmitting the position to the underwater mobile object 102 by acoustic communication, the underwater mobile object 102 can acquire its current position. An inertial navigation method may be employed as the underwater positioning or may be used together with the acoustic positioning in order to enhance navigation accuracy.

The inertial navigation method is a method of measuring the attitude angle (the lateral angle, the elevation angle, and the azimuth angle) of the underwater mobile object 102 and a velocity of the underwater mobile object 102 relative to the sea bottom in a three-dimensional space using a sensor (for example, a gyro or a Doppler flowmeter) mounted on the underwater mobile object 102 for a short time, calculating the direction in which the target moves in the terrestrial coordinate system and the distance by which the target moves, and adding the calculated values. The inertial navigation method has a merit in that a position can be measured at short intervals, but since a position error increases with the lapse of time, accumulation of the position error can be prevented by periodically replacing the position measured using the inertial navigation method with the position measured using the USBL in which the position error does not increase with the lapse of time.

The underwater mobile object 102 is provided with a receiving-side pad 111 of the power-receiving device 110. The receiving-side pad 111 is disposed on the top of a substantially cylindrical body of the underwater mobile object 102. The receiving-side pad 111 includes a power-receiving coil 111*a* (a coil) and a cover member 111*b*. The cover member 111*b* has satisfactory water resistance and pressure resistance and is formed of a nonmagnetic and nonconductive material (such as plastics or fiber-reinforced plastics) transmitting an electromagnetic field used for wireless power supply. The cover member 111*b* constituting a part of the surface of the underwater mobile object 102 has a smoothly shaped surface to reduce flow resistance disturbing navigation. The power-receiving coil 111*a* may be sealed with a nonmagnetic and nonconductive resin (for example, an epoxy resin) which has water resistance and pressure resistance and which transmits an electromagnetic field used for wireless power supply, instead of the cover member 111*b*.

The power-receiving coil 111*a* is disposed in the back of the cover member 111*b*. The power-receiving coil 111*a* is wirelessly receives AC power by electromagnetic coupling to a power-transmitting coil 121*a* disposed in the platform 103. In this wireless power supply, since an electrode or a connector exposed to the outside is not necessary, the electrode or the connector is not damaged due to collision with underwater floating materials and the electrode does not get rusty underwater during the supply of power. When the wireless power supply is possible, the shape, size, or type (such as a solenoid type or a circular type) of the power-receiving coil 111a or the power-transmitting coil 121a is not particularly limited and the power-receiving coil 111a and the power-transmitting coil 121a may be different from each other in shape and size.

The wireless power supply from the power-transmitting coil 121a to the power-receiving coil 111a in the wireless power supply system 101 according to this embodiment is performed on the basis of a magnetic resonance system. That is, resonance capacitors (not shown) constituting resonance circuits are connected to the power-transmitting coil 121a and the power-receiving coil 111a. For example, the capacitance of the resonance capacitors is set such that the resonance frequency of the transmitting-side resonance circuit including the power-transmitting coil 121a and the resonance capacitor and the resonance frequency of the receiving-side resonance circuit including the power-receiving coil 111a and the resonance capacitor are the same frequency. Here, the "same" allows a slight difference in resonance frequency as long as the wireless power supply can be performed with high efficiency.

The underwater mobile object 102 includes a receiving-side power conversion circuit 112 and a power storage device 113 in addition to the receiving-side pad 111 as the power-receiving device 110. The underwater mobile object 102 additionally includes an inverter 114 and a motor 115.

The receiving-side power conversion circuit 112 is a power conversion circuit that converts received power, which is received by the power-receiving coil 111a from the power-transmitting coil 121a by the wireless power supply, into DC power and supplies the converted DC power to the power storage device 113.

The receiving-side power conversion circuit 112 may include only a rectifier circuit (for example, a diode bridge) and a smoothing circuit (for example, a π type circuit including a reactor and a capacitor) or may include a DC/DC converter additionally.

The power storage device 113 is a device that can accumulate power sufficient for a driving power source of the underwater mobile object 102, and examples thereof include a lithium ion secondary battery, a nickel-hydrogen secondary battery, and an electric double-layer capacitor with a large capacity. The power storage device 113 is charged with the DC power supplied from the receiving-side power conversion circuit 112 and supplies navigation driving power to the inverter 114.

The inverter 114 converts the supplied DC power into AC power and drives the motor 115. The motor 115 is connected to the main thruster 104 and rotates the main thruster 104. The combination of the inverter 114 and the motor 115 is arbitrary as long as the rotation speed of the main thruster 104 can be changed to allow the underwater mobile object 102 to navigate. For example, when the motor 115 is a three-phase induction motor or a three-phase synchronization motor, the inverter 114 can be an inverter that supplies a three-phase AC current.

The platform 103 is a ship on water or a station in water to which the underwater mobile object 102 is returned. The platform 103 is provided with a transmitting-side pad 121 of the power-transmitting device 120. The transmitting-side pad 121 includes a power-transmitting coil 121a (a coil) and a cover member 121b. The cover member 121b has satisfactory water resistance and pressure resistance and is formed of a nonmagnetic and nonconductive material (such as plastics or fiber-reinforced plastics) transmitting an electromagnetic field used for wireless power supply. The power-transmitting coil 121a is disposed in the back of the cover member 121b. The power-transmitting coil 121a may be sealed with a nonmagnetic and nonconductive resin (for example, an epoxy resin) which has water resistance and pressure resistance and which transmits an electromagnetic field used for wireless power supply, instead of the cover member 121b.

The platform 103 includes a transmitting-side DC-AC conversion circuit 122 and a transmitting-side power conversion circuit 123 in addition to the transmitting-side pad 121 as the power-transmitting device 120. The platform 103 additionally includes a power source 124. The transmitting-side DC-AC conversion circuit 122 includes a circuit such as a half bridge or a full bridge which is generally used as a transmitting-side inverter circuit, converts DC power supplied from the transmitting-side power conversion circuit 123 into AC power suitable for the wireless power supply in a magnetic resonance system, and supplies the converted AC power to the power-transmitting coil 121a. The inverter circuit generally employs a method of driving a gate of a semiconductor power element such as a power MOSFET (Metal-Oxide-Semiconductor Field-Effect Transistor) or an IGBT (Insulated Gate Bipolar Transistor) with a pulse signal and performing pulse width modulation (PWM) while changing the period or length of the pulse signal.

The transmitting-side power conversion circuit 123 is a power conversion circuit that converts power supplied from the power source 124 into DC power and supplies the converted DC power to the transmitting-side DC-AC conversion circuit 122. When AC power is supplied from the power source 124, the transmitting-side power conversion circuit 123 has a configuration in which a rectifier circuit constituted by, for example, a diode bridge and a DC/DC converter having a stepping-up function, a stepping-down function, or a stepping-up/down function are combined and may be configured to have additionally a power factor correction (PFC) function. When DC power is supplied from the power source 124, the transmitting-side power conversion circuit 123 may be a DC/DC converter having a stepping-up function, a stepping-down function, or a stepping-up/down function. In this configuration, the output power of the transmitting-side power conversion circuit 123 can be changed by changing the output voltage of the DC/DC converter. The converter to be used may be any one of a non-insulated type (such as a chopper) and an insulated type (such as use of a transformer). The power source 124 is, for example, a commercial power source, a solar battery, or a wind power generator and supplies power thereof to the transmitting-side power conversion circuit 123.

As shown in FIG. 1, the platform 103 having the above-mentioned configuration is provided with a spacer member 130 having gaps 131 for forming a liquid flow between the receiving-side pad 111 and the transmitting-side pad 121. The spacer member 130 prevents a close contact between the opposing surfaces 111A and 121A of the receiving-side pad 111 and the transmitting-side pad 121 and interposes liquid between the receiving-side pad 111 and the transmitting-side pad 121. The liquid mentioned herein is seawater, but may be fresh water or pool water or other liquid depending on the specifications of the underwater mobile object 102. The spacer member 130 in this embodiment is formed of an abutting material that is disposed to protrude vertically from the opposing surface 121A of the transmitting-side pad 121 and of which a tip comes in contact with the opposing surface 111A of the receiving-side pad 111.

A plurality of spacer members 130 are disposed to protrude from the opposing surface 121A of the transmitting-side pad 121. The plurality of spacer members 130 are disposed outside an opposing area X in which the power-receiving coil 111a and the power-transmitting coil 121a oppose each other. In this embodiment, as shown in FIG. 20, the plurality of spacer members 130 are arranged at four positions to surround the opposing area X. A gap 31 is formed between the neighboring spacer members 130 so as to exchange surrounding liquid as indicated by an arrow in FIG. 20. The gap 131 may be formed by forming breaks or holes in a continuous spacer member 130.

As shown in FIGS. 19 and 20, the spacer member 130 is formed in a narrow rectangular parallelepiped shape as shown in FIGS. 19 and 20. According to this configuration, it is possible to decrease an area in which the spacer member 130 comes in contact with the opposing surface 111A of the receiving-side pad 111 and an area in which the spacer member 130 occupies the opposing surface 121A of the transmitting-side pad 121 and to secure a large area in which the opposing surfaces 111A and 121A come in contact with the liquid. The spacer member 130 is formed of a nonmagnetic and nonconductive material transmitting an electromagnetic field used for the wireless power supply. The spacer member 130 in this embodiment comes in contact with the receiving-side pad 111 and thus is formed of a buffer material such as nonmagnetic and nonconductive rubber.

An operation of the wireless power supply system 101 having the above-mentioned configuration will be described below.

As shown in FIG. 18, the wireless power supply system 101 performs the wireless power supply to the underwater mobile object 102 that has been returned to the platform 103. The underwater mobile object 102 determines whether to be returned to the platform 103 on the basis of the state of charge of the power storage device 113, and is returned to the platform 103 when it is determined that the underwater mobile object should be returned to the platform. The underwater mobile object 102 returned to the platform 103 moves to a position at which the receiving-side pad 111 and the transmitting-side pad 121 oppose each other as shown in FIG. 18.

Specifically, the underwater mobile object 102 moves until the receiving-side pad 111 is located below the transmitting-side pad 121 by external induction from the platform 103 or autonomous movement. Then, the underwater mobile object 102 sets its buoyant force to rise (for example, the buoyant force is set in advance to cause the underwater mobile object 102 to rise in a state in which there is no ballast, and rises by discarding a ballast of the underwater mobile object 102 or excluding ballast water in the underwater mobile object 102 with compressed air) or rises by driving of the vertical thruster. When the underwater mobile object 102 rises, the opposing surface 111A of the receiving-side pad 111 is pressed against the spacer members 130. The spacer members 130 in this embodiment are formed of a buffer material such as rubber and thus can relax shock between the underwater mobile object 102 and the platform 103.

The spacer members 130 prevent a close contact between the receiving-side pad 111 and the transmitting-side pad 121 and interpose liquid between the receiving-side pad 111 and the transmitting-side pad 121. The wireless power supply system 101 performs the wireless power supply in a state in which the liquid is present between the receiving-side pad 111 and the transmitting-side pad 121. In the wireless power supply, the distance between the power-receiving coil 111a and the power-transmitting coil 121a increases and the liquid is present therebetween. Accordingly, a large effect can be obtained by employing a magnetic resonance system having a distance in which power can be efficiently supplied as in this embodiment. Here, the electromagnetic field for the wireless power supply generated between the power-receiving coil 111a and the power-transmitting coil 121a passes through the cover member 111b, the spacer member 130, and the cover member 121b, but these constituents are formed of a nonmagnetic and nonconductive material and thus do not decrease the power supply efficiency.

When the wireless power supply is performed, the power-transmitting coil 121a or the power-receiving coil 111a transmitting or receiving high-frequency power emits heat. Heat generated from the power-receiving coil 111a is transmitted to the opposing surface 111A via the cover member 111b constituting the receiving-side pad 111 and is additionally cooled by the liquid coming in contact with the opposing surface 111A. Heat generated from the power-transmitting coil 121a is transmitted to the opposing surface 121A via the cover member 121b constituting the transmitting-side pad 121 and is additionally cooled by the liquid coming in contact with the opposing surface 121A. Since liquid has a large heat capacity per unit volume, the liquid can efficiently take away the heat generated from the power-receiving coil 111a or the power-transmitting coil 121a. Here, the temperature of the liquid that is interposed between the receiving-side pad 111 and the transmitting-side pad 121 and absorbs heat therefrom rises.

The spacer member 130 in this embodiment includes the gaps 131 as shown in FIG. 20. The gaps 131 form a liquid flow between the receiving-side pad 111 and the transmitting-side pad 121. That is, it is possible to form a flow for exchanging the liquid heated by the opposing surface 111A of the receiving-side pad 111 or the opposing surface 121A of the transmitting-side pad 121 with neighboring cold liquid using the gaps 131 (which is indicated by an arrow in FIG. 20). When a liquid flow is formed between the receiving-side pad 111 and the transmitting-side pad 121, the liquid taking away heat from the power-receiving coil 111a or the power-transmitting coil 121a and rising in temperature is eliminated from between the receiving-side pad 111 and the transmitting-side pad 121 and new liquid is introduced between the receiving-side pad 111 and the transmitting-side pad 121. Accordingly, it is possible to keep the temperature of the liquid interposed between the receiving-side pad 111 and the transmitting-side pad 121 low and to suppress a decrease in cooling efficiency.

In this way, according to the aforementioned embodiment, as the wireless power supply system 101 in which the power-receiving device 110 is disposed in the underwater mobile object 102, the receiving-side pad 111 including the power-receiving coil 111a of the power-receiving device 110 and the transmitting-side pad 121 including the power-transmitting coil 121a of the power-transmitting device 120 oppose each other with liquid interposed between the receiving-side pad 111 and the transmitting-side pad 121, and wireless power supply is performed using magnetic coupling of the power-receiving coil 111a and the power-transmitting coil 121a, by employing a configuration in which the spacer members 130 having the gaps 131 for forming a liquid flow between the receiving-side pad 111 and the transmitting-side pad 121 are provided, it is possible to keep the temperature of the liquid interposed between the receiving-side pad 111 and the transmitting-side pad 121 low and to appropriately cool the power-receiving coil 111a or the power-transmitting coil 121a emitting heat by the wireless power supply in water. Particularly, according to one aspect of the present disclosure, for example, since a heat transfer pipe connecting the receiving-side pad 111 to the platform 103 is not provided, movement of the receiving-side pad 111 and the underwater mobile object 102 provided therewith is not constrained and the underwater mobile object 102 can move. This aspect of the present disclosure is excellent in that it is possible to secure mobility of the receiving-side pad 111 and the underwater mobile object 102 provided therewith and to cool the power-receiving coil 111a or the power-transmitting coil 121a when the wireless power supply is performed.

Second Embodiment

A fifth embodiment of the present disclosure will be described below. In the following description, elements identical or similar to those of the aforementioned embodiments will be identified by the same reference signs and a description thereof will be made in brief or will not be repeated here.

Figure 21:
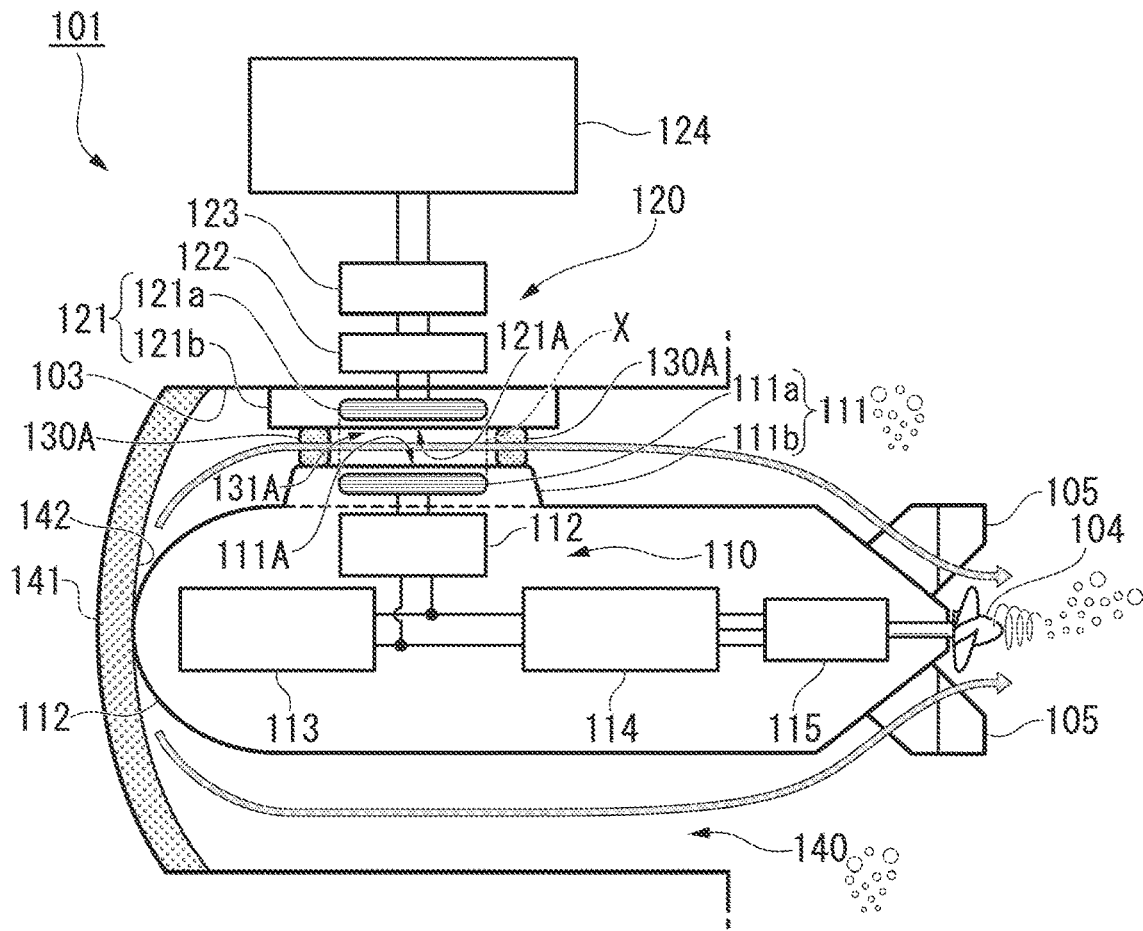
FIG. 21 is a diagram showing the entire configuration of a wireless power supply system according to a fifth embodiment of the present disclosure.
Figure 22:
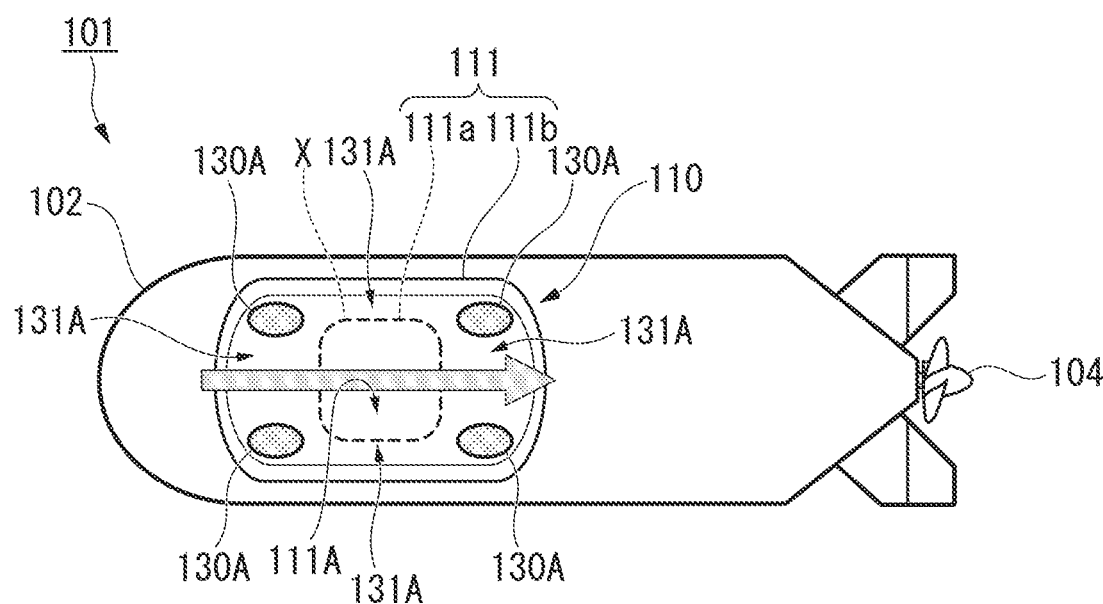
FIG. 22 is a top view of an underwater mobile object according to the fifth embodiment of the present disclosure.

FIG. 21 is a diagram showing the entire configuration of a wireless power supply system 101 according to the fifth embodiment of the present disclosure. FIG. 22 is a top view of an underwater mobile object 102 according to the fifth embodiment of the present disclosure.

As shown in FIG. 21, a platform 103 according to the fifth embodiment is provided with a recessed section 140 that can accommodate at least a part of the underwater mobile object 102 with a gap. The transmitting-side pad 121 in the fifth embodiment is disposed in the recessed section 140. The recessed section 140 is a horizontal hole that is opened to a size larger than that of the underwater mobile object 102. The recessed section 140 includes a wall portion 141 (movement restricting portion) opposing the head of the underwater mobile object 102. The wall portion 141 in this embodiment is formed in a bowl shape. The surface of the wall portion 141 is provided with a shock absorbing member 142 having resilience such as rubber absorbing a shock based on collision with the head of the underwater mobile object 102. The wall portion 141 and the shock absorbing member 142 are not located in an area through which the electromagnetic field for wireless power supply and thus does not need to be formed of a nonmagnetic and nonconductive material.

The wireless power supply system 101 according to the fifth embodiment operates the main thruster 104 (a liquid flow device, a thruster) of the underwater mobile object 102 to apply a flow to liquid during the wireless power supply as shown in FIG. 21 in order to promote exchanging of liquid interposed between the receiving-side pad 111 and the transmitting-side pad 121. The main thruster 104 may always rotate during the wireless power supply or may intermittently rotate. In the wireless power supply system 101 according to this embodiment, the main thruster 104 rotates for several seconds to several minutes at a predetermined time interval (for example, one hour). According to this configuration, it is possible to suppress power consumption of the power storage device 113 and to shorten the charging time in comparison with a case in which the main thruster 104 always rotates. A temperature sensor may be disposed in the receiving-side pad 111 and the main thruster 4 may rotate when the measurement result of the temperature sensor is greater than a predetermined threshold value.

A spacer member 130A in the fifth embodiment is disposed in the underwater mobile object 102. The spacer member 130A is formed of an abutting material that is disposed to protrude vertically from the opposing surface 111A of the receiving-side pad 111 and of which a tip comes in contact with the opposing surface 121A of the transmitting-side pad 121. As shown in FIG. 22, the spacer member 130A is formed in an elliptical shape in a plan view. The spacer member 130A is disposed such that a long side direction of the elliptical shape in the plan view is parallel to a flow direction of liquid by the main thruster 104. According to this configuration, the spacer member 130A does not function as resistance of the liquid flow by the main thruster 104. During navigation of the underwater mobile object 102, water resistance is hard to be applied to the underwater mobile object 102 including the spacer members 103A.

According to the fifth embodiment having the aforementioned configuration, as shown in FIG. 21, the main thruster 104 rotates intermittently during the wireless power supply. When the main thruster 104 rotates, liquid is drawn into the main thruster 104 and a liquid flow is formed around the underwater mobile object 102 (which is indicated by an arrow in FIG. 21). The liquid flow formed around the underwater mobile object 102 is introduced between the receiving-side pad 111 and the transmitting-side pad 121 via the gaps 131A of the spacer members 130A and passes through the opposing area X in which the power-receiving coil 111a and the power-transmitting coil 121a oppose each other, as shown in FIG. 22. By this liquid flow, it is possible to actively eliminate the liquid taking away heat from the power-receiving coil 111a or the power-transmitting coil 121a and rising in temperature and to promote exchange of liquid interposed between the receiving-side pad 111 and the transmitting-side pad 121. Accordingly, according to the fifth embodiment, it is possible to keep the temperature of the liquid interposed between the receiving-side pad 111 and the transmitting-side pad 121 low and to appropriately cool the power-receiving coil 111a or the power-transmitting coil 121a emitting heat due to the underwater wireless power supply.

In the fifth embodiment, a flow is applied to liquid by rotating the main thruster 104 disposed in the underwater mobile object 102. According to this configuration, since the main thruster 104 of the underwater mobile object 102 is used, it is not necessary to provide the underwater mobile object 102 or the platform 103 with additional equipment such as a screw. As shown in FIG. 21, the platform 103 according to the fifth embodiment is provided with the wall portion 141 for restricting movement of the underwater mobile object 102 when the main thruster 104 applies a flow to the liquid. According to this configuration, since the head of the underwater mobile object 102 is pressed against the wall portion 141 and forward movement of the underwater mobile object 102 is restricted, it is possible to maintain the opposing state of the receiving-side pad 111 and the transmitting-side pad 121 and to suppress a decrease in power supply efficiency. By forming the wall portion 141 in a bowl shape as in this embodiment, it is possible to center the underwater mobile object 102 and to satisfactorily prevent a relative positional deviation between the receiving-side pad 111 and the transmitting-side pad 121 due to rotation of the main thruster 104, when the head of the underwater mobile object 102 is pressed against the wall portion 141.

The fifth embodiment is not limited to the aforementioned configuration and can employ, for example, the following modified examples.

Figure 23:
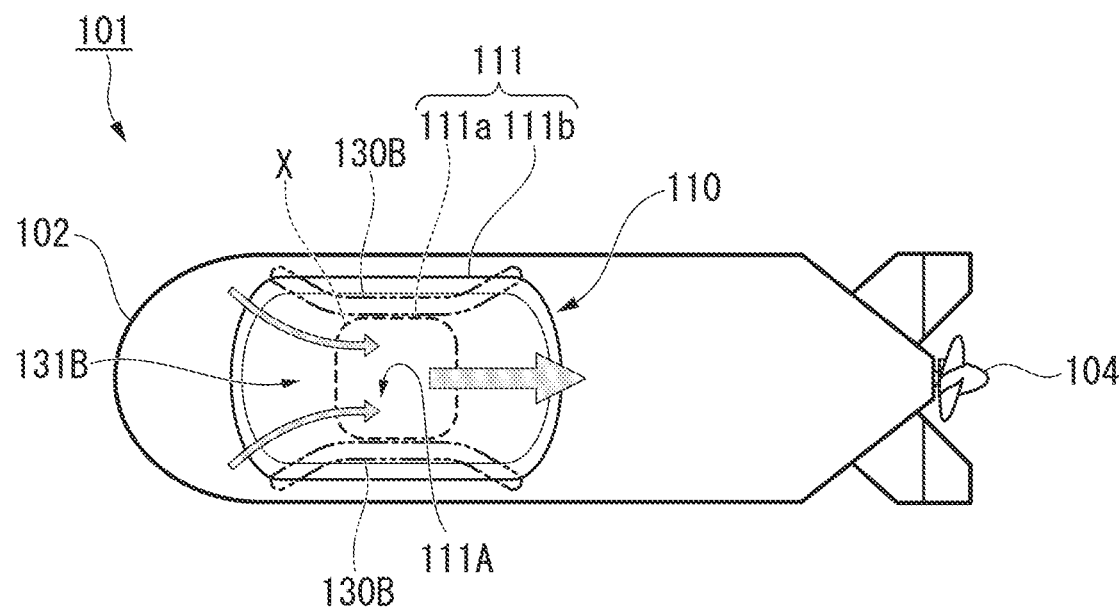
FIG. 23 is a top view of an underwater mobile object according to a modified example of the fifth embodiment of the present disclosure.

FIG. 23 is a top view of an underwater mobile object 102 according to one modified example of the fifth embodiment of the present disclosure. In this modified example, as shown in FIG. 23, a spacer member 130B includes a gap 131B of which the width gradually decreases toward an opposing area X on an upstream side from the opposing area X in which the power-receiving coil 111a and the power-transmitting coil 121a oppose each other in the flow direction of the liquid due to the main thruster 104. The spacer member 130B is formed such that the width of the gap 131B is constant in the opposing area X and the width gradually increases downstream from the opposing area X. When the spacer member 130B is disposed in the underwater mobile object 102, water resistance during navigation increases. Accordingly, the spacer member 130B is preferably disposed in the platform 3.

According to this modified example, when the main thruster 104 rotates during the wireless power supply, liquid is introduced between the receiving-side pad 111 and the transmitting-side pad 121 via the gap 131B of the spacer member 130B. The width of the gap 131B gradually decreases toward the opposing area X and the flow rate of the liquid in the opposing area X increases by decreasing a flow passage area of the liquid. Since the width of the gap 131B increases downstream from the opposing area X, the liquid is discharged downstream without being subjected to resistance. Accordingly, it is possible to actively eliminate the liquid taking away heat from the power-receiving coil 111a or the power-transmitting coil 121a and rising in temperature and to promote exchanging of liquid interposed between the receiving-side pad 111 and the transmitting-side pad 121. As the flow rate of the liquid increases, it is possible to decrease the rotation speed of the main thruster 104, to suppress the power consumption of the power storage device 113, and to shorten the charging time.

In another modified example, a plurality of through-holes in the horizontal direction may be formed in the wall portion 141 and the liquid may flow through the wall portion 141 when the main thruster 104 rotates, thereby causing the liquid to more easily flow.

Sixth Embodiment

A sixth embodiment of the present disclosure will be described below. In the following description, elements identical or similar to those of the aforementioned embodiments will be identified by the same reference signs and a description thereof will be made in brief or will not be repeated here.

Figure 24:
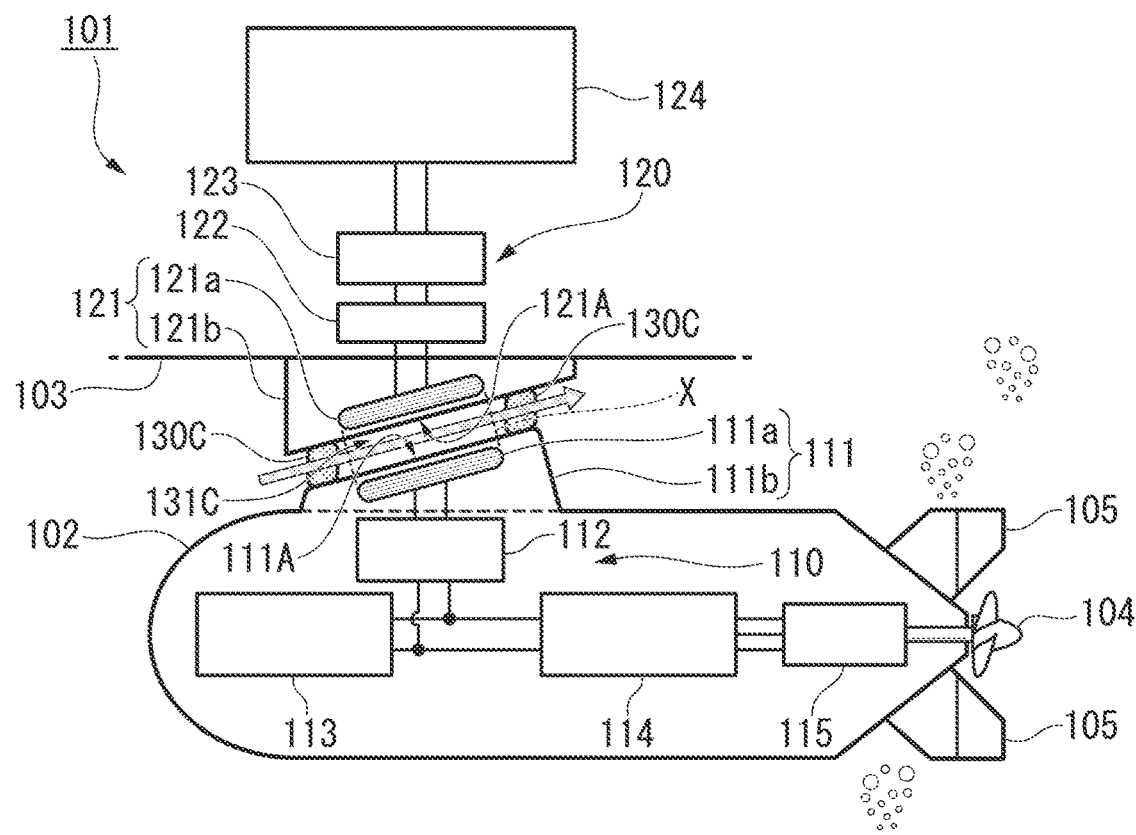
FIG. 24 is a diagram showing the entire configuration of a wireless power supply system according to a sixth embodiment of the present disclosure.

FIG. 24 is a diagram showing the entire configuration of a wireless power supply system 101 according to the sixth embodiment of the present disclosure.

As shown in FIG. 24, in the sixth embodiment, the opposing surfaces 111A and 121A of the receiving-side pad 111 and the transmitting-side pad 121 are disposed to be inclined with respect to the horizontal plane. The opposing surface 111A of the receiving-side pad 111 is inclined such that the front side of the underwater mobile object 102 is lowered and the rear side of the underwater mobile object 102 is raised. According to this configuration, in comparison with a case in which the opposing surface 111A of the receiving-side pad 111 is inclined reversely (a case in which the front side of the underwater mobile object 102 is raised and the rear side of the underwater mobile object 102 is lowered), it is possible to reduce water resistance of the underwater mobile object 102 during navigation. The opposing surface 121A of the transmitting-side pad 121 is inclined to be parallel to the opposing surface 111A of the receiving-side pad 111.

The power-receiving coil 111a disposed in the back of the opposing surface 111A is inclined in the same way as the opposing surface 111A. The power-transmitting coil 121a disposed in the back of the opposing surface 121A is inclined in the same way as the opposing surface 121A. According to this configuration, even when the opposing surfaces 111A and 121A are inclined with respect to the horizontal plane, the distance between the power-receiving coil 111a and the power-transmitting coil 121a can be made not to increase and it is thus possible to suppress a decrease in power supply efficiency. A plurality of spacer members 130C of the sixth embodiment are disposed to protrude from the opposing surface 121A of the transmitting-side pad 121. The spacer members 130C are arranged at four positions similar to the arrangement shown in FIG. 22 according to the fifth embodiment and a gap 131C is formed between the neighboring spacer members 130C.

According to the sixth embodiment, when the wireless power supply is performed without bringing the receiving-side pad 111 and the transmitting-side pad 121 into close contact with each other using the spacer members 130C, liquid interposed between the receiving-side pad 111 and the transmitting-side pad 121 absorbs heat generated from the power-receiving coil 111a or the power-transmitting coil 121a and the temperature of the liquid rises. When the temperature of liquid rises, an upward convection flow occurs due to generation of a buoyant force based on a decrease in density as indicated by an arrow in FIG. 24. Since the opposing surfaces 111A and 121A in the sixth embodiment are inclined, the heated liquid rises by the convection flow and cold liquid is naturally introduced from down. By this liquid flow, it is possible to actively eliminate the liquid taking away heat from the power-receiving coil 111a or the power-transmitting coil 121a and rising in temperature and to promote exchange of liquid interposed between the receiving-side pad 111 and the transmitting-side pad 121. Accordingly, according to the sixth embodiment, it is possible to keep the temperature of the liquid interposed between the receiving-side pad 111 and the transmitting-side pad 121 low without consuming power of the power storage device 113 and to appropriately cool the power-receiving coil 111a or the power-transmitting coil 121a emitting heat due to the underwater wireless power supply.

The sixth embodiment is not limited to the aforementioned configuration and can employ, for example, the following modified examples.

Figure 25:
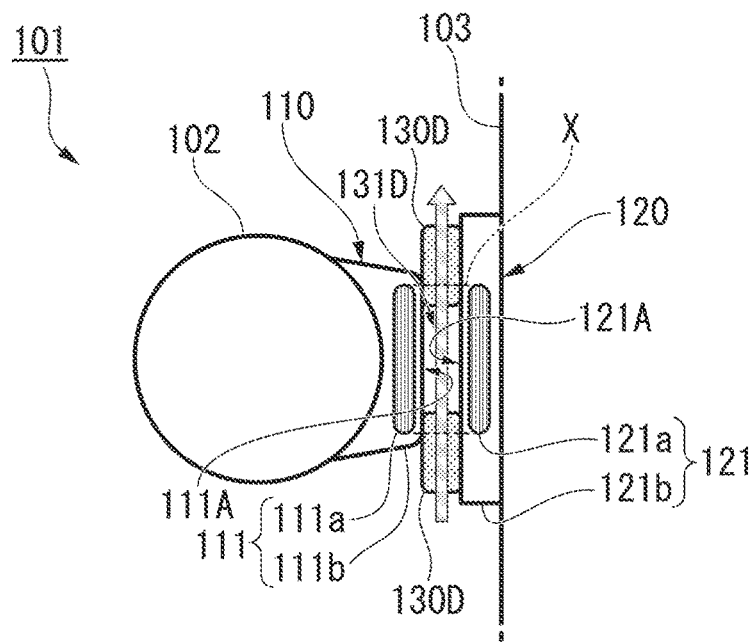
FIG. 25 is a front view of an underwater mobile object according to a modified example of the sixth embodiment of the present disclosure.

FIG. 25 is a front view of an underwater mobile object 102 according to one modified example of the sixth embodiment of the present disclosure.

In this modified example, as shown in FIG. 25, the opposing surfaces 111A and 121A of the receiving-side pad 111 and the transmitting-side pad 121 are disposed to be perpendicular to the horizontal plane. In this modified example, the receiving-side pad 111 disposed on one side surface of the underwater mobile object 102 and receives the wireless power supply from the side. The transmitting-side pad 121 is disposed in the platform 103 to oppose the receiving-side pad 111 in the width direction of the underwater mobile object 102. A plurality of spacer members 130D of this modified example are disposed to protrude from the opposing surface 121A of the transmitting-side pad 121. For example, the spacer members 130C are arranged at four positions similar to the arrangement shown in FIG. 20 according to the fourth embodiment and a gap 131D are formed between the neighboring spacer members 130D.

According to this modified example, when the wireless power supply is performed without bringing the receiving-side pad 111 and the transmitting-side pad 121 into close contact with each other using the spacer members 130D, liquid interposed between the receiving-side pad 111 and the transmitting-side pad 121 absorbs heat generated from the power-receiving coil 111a or the power-transmitting coil 121a and the temperature of the liquid rises. When the temperature of liquid rises, an upward convection flow in the vertical direction occurs due to generation of a buoyant force based on a decrease in density as indicated by an arrow in FIG. 25. Since the opposing surfaces 111A and 121A rise vertically, the heated liquid rises by the convection flow and cold liquid is naturally introduced from down. By this liquid flow, it is possible to actively eliminate the liquid taking away heat from the power-receiving coil 111a or the power-transmitting coil 121a and rising in temperature and to promote exchange of liquid interposed between the receiving-side pad 111 and the transmitting-side pad 121. Accordingly, according to the fifth embodiment, it is possible to keep the temperature of the liquid interposed between the receiving-side pad 111 and the transmitting-side pad 121 low without consuming power of the power storage device 113 and to appropriately cool the power-receiving coil 111a or the power-transmitting coil 121a emitting heat due to the underwater wireless power supply.

While exemplary embodiments of the present disclosure have been described above with reference to the drawings, the present disclosure is not limited to the embodiments. The shapes, combinations, and the like of the constituent members described in the aforementioned embodiments are only examples and can be modified in various forms on the basis of design requests or the like without departing from the gist of the present disclosure.

Figure 28:
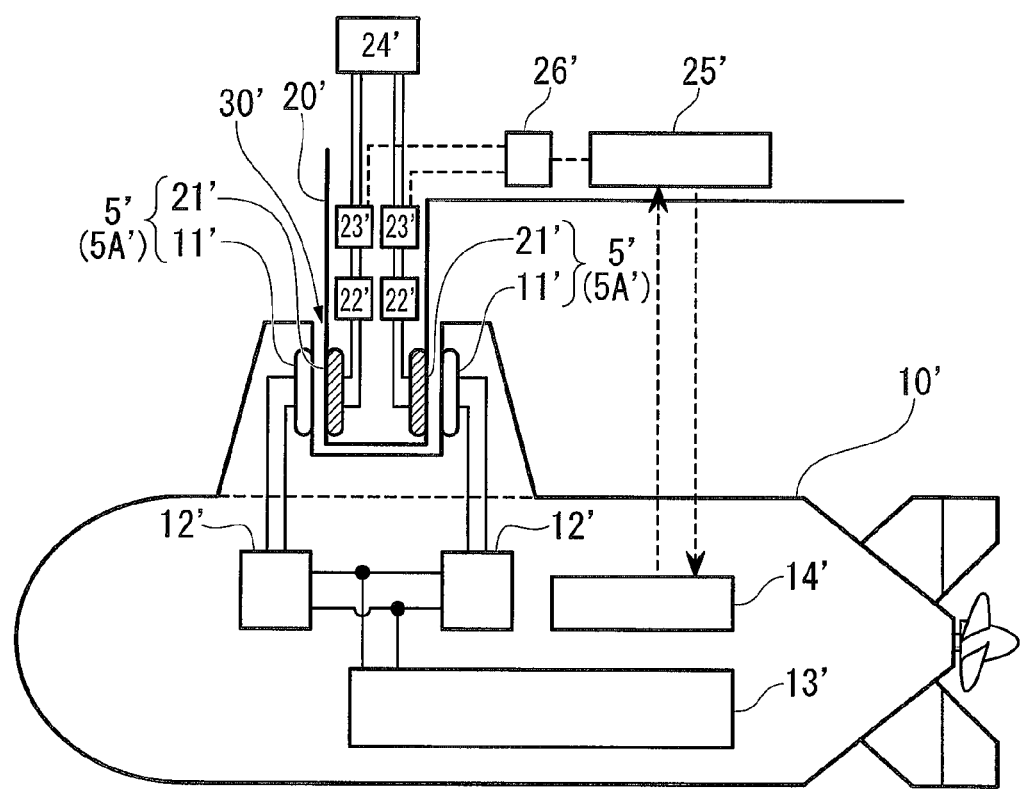
FIG. 28 is a diagram showing a partial configuration of a wireless power supply system according to another embodiment of the present disclosure.

For example, the first embodiment describes the configuration in which the recessed section 30 is disposed in the platform 20 and power is supplied from the platform 20 to the underwater mobile object 10 and the second embodiment describes the configuration in which the recessed section 30 is disposed in the platform 20, at least a part of the underwater mobile object 10 is accommodated in the recessed section 30 with a gap, and power is supplied from the underwater mobile object 10 to the platform 20, but a configuration in which the recessed section 30 is disposed in the underwater mobile object 10 and power is supplied from the underwater mobile object 10 to the platform 20 or a configuration in which the recessed section 30' is disposed in the underwater mobile object 10', at least a part (the body) of the platform 20' is accommodated in the recessed section 30' with a gap, and power is supplied from the platform 20' to the underwater mobile object 10' may be employed (refer to FIG. 28).

For example, in the above-mentioned embodiments, power is supplied from the wall portions of the recessed section 30 vertically facing each other (for example, see FIG. 1) or the wall portions facing each other laterally (for example, see FIG. 5), but the power supply direction is not limited thereto. For example, power may be supplied from the wall portions of the recessed section 30 facing each other in the inclined direction or power may be supplied in four directions from the wall portions 31 and 32.

For example, the above-mentioned embodiments describe the configuration in which the scraper member 40 is disposed in the underwater mobile object 10 and the platform 20, but a configuration in which the scraper member 40 is disposed in only the underwater mobile object 10 or a configuration in which the scraper member 40 is disposed in only the platform 20 may be employed.

The present disclosure can be applied to a case in which the underwater mobile object 10 is a manned underwater vehicle or can be applied to a case in which at least one of the power-receiving device and the power-transmitting device is a mobile object such as a vehicle, a ship, an undersea vehicle, or an aircraft.

For example, the present disclosure can exhibit particular advantages in combination with wireless power supply in a magnetic resonance system that can allow a large positional deviation, but may be combined with wireless power supply in another system such as an electromagnetic induction system.

For example, the configurations of the above-mentioned embodiments can be appropriately replaced or combined.

For example, the present disclosure can employ the following configurations.

Figure 26A:
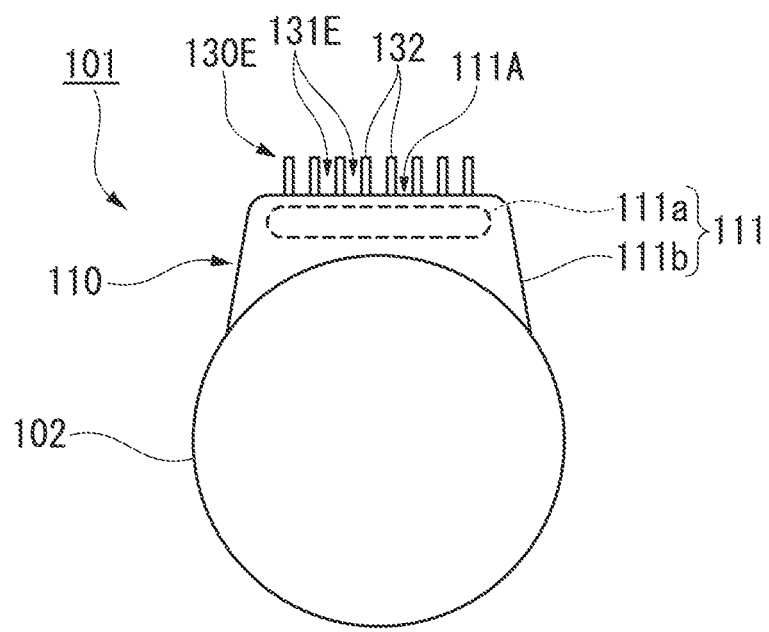
FIG. 26A is a front view of an underwater mobile object according to another embodiment of the present disclosure.
Figure 26B:
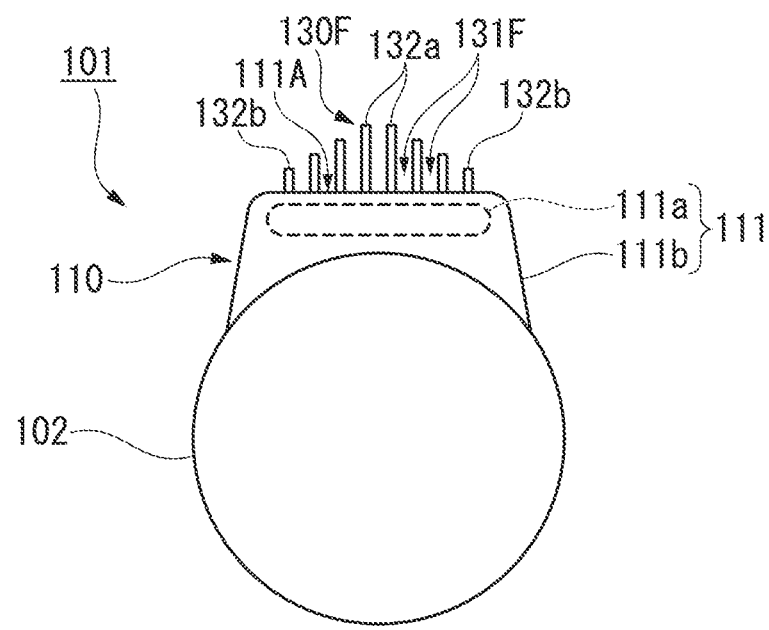
FIG. 26B is a front view of an underwater mobile object according to another embodiment of the present disclosure.

FIGS. 26A and 26B are front views of underwater mobile objects 102 according to other embodiments of the present disclosure. In the embodiment shown in FIG. 26A, a spacer member 130E of a fin shape (fin shape) is provided. The spacer member 130E includes a plurality of fins 132 protruding from the opposing surface 111A of the receiving-side pad 111. The spacer member 130E can be formed integrally with the cover member 111b. The plurality of fins 132 are arranged at intervals in the width direction of the underwater mobile object 102 and a gap 131E is formed between the neighboring fins 132. The fins 132 are arranged to extend in the front-rear direction of the underwater mobile object 102 to reduce water resistance of the underwater mobile object 102. In this way, since a contact area with liquid can be increased by disposing the spacer member 130E of a fin shape, it is possible to enhance cooling efficiency using liquid.

In the embodiment shown in FIG. 26B, a spacer member 130F of a fin shape in which end fins 132b are lower than a center fin 132a in the width direction of the underwater mobile object 102 may be provided. The spacer member 130F can be formed integrally with the cover member 111b and includes gaps 131F. The spacer member 130F has a shape that is the highest at the center fin 132a and is gradually lowered toward the end fins 132. According to this configuration, similar to the embodiment shown in FIG. 26A, since the contact area with liquid can be increased, it is possible to enhance cooling efficiency using liquid. According to this configuration, since the end fins 132b are the lowest, it is possible to suppress damage due to collision with underwater floating materials (such as driftwood or fish) during navigation of the underwater mobile object 102.

Figure 27A:
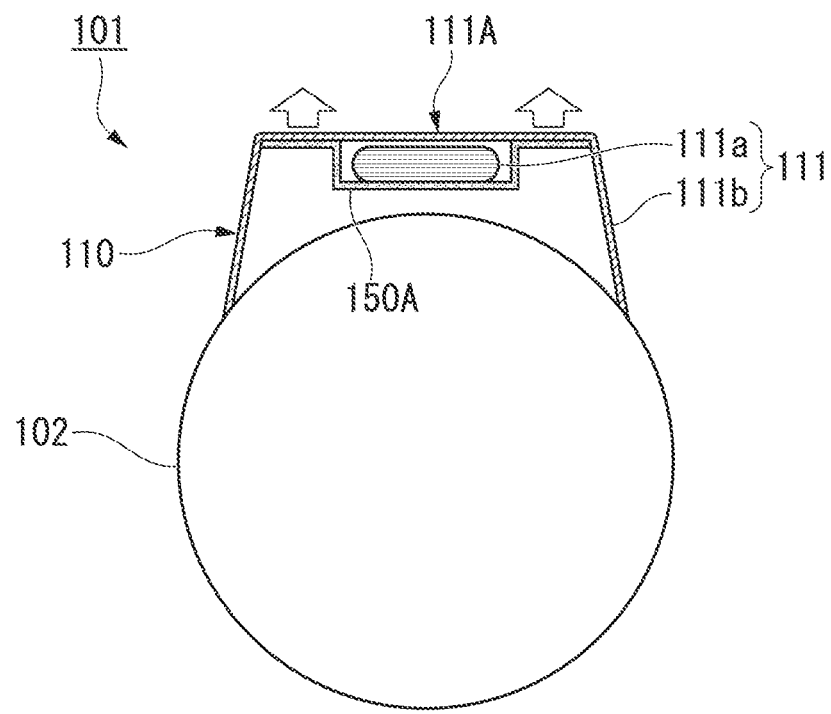
FIG. 27A is a diagram showing a configuration of a receiving-side pad according to another embodiment of the present disclosure.
Figure 27B:
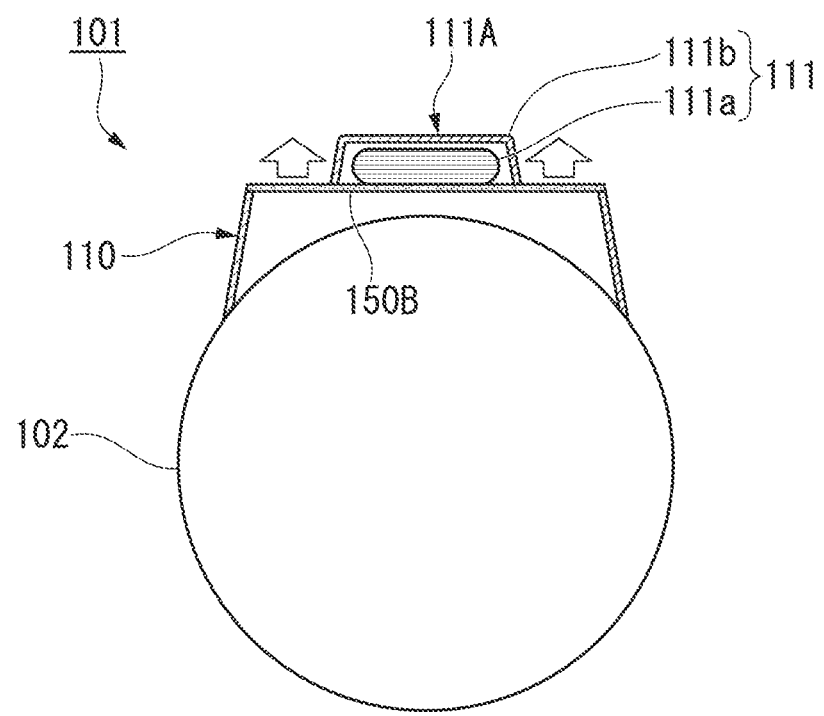
FIG. 27B is a diagram showing a configuration of a receiving-side pad according to another embodiment of the present disclosure.

FIGS. 27A and 27B are diagrams showing configurations of receiving-side pads 111 according to other embodiments of the present disclosure. In the embodiment shown in FIG. 27A, a heat transfer plate 150A that thermally connects the back of the power-receiving coil 111a disposed in the underwater mobile object 102 and the front surface of the underwater mobile object 102 is provided. The heat transfer plate 150A extends from the back of the power-receiving coil 111a to the back of the cover member 111b forming a part of the surface of the underwater mobile object 102. The heat transfer plate 150A is formed, for example, a metal material such as aluminum having heat transfer characteristics and also functions as a magnetic shield. According to this configuration, heat generated from the power-receiving coil 111a can be transferred from the back of the power-receiving coil 111a to the surface (that is, the opposing surface 111A) of the underwater mobile object 102 coming in contact with liquid using the heat transfer plate 150A. Accordingly, it is possible to effectively cool the power-receiving coil 111a emitting heat by the wireless power supply.

As in the embodiment shown in FIG. 27B, a heat transfer plate 150B may be provided to be exposed from the surface of the underwater mobile object 102. The underwater mobile object 10B extends from the back of the power-receiving coil 111a and is exposed from the surface of the underwater mobile object 102. According to this configuration, heat generated from the power-receiving coil 111a can be directly transferred from the back of the power-receiving coil 111a to the surface of the underwater mobile object 102 coming in contact with liquid using the heat transfer plate 150B. Accordingly, it is possible to more effectively cool the power-receiving coil 111a emitting heat by the wireless power supply.

For example, the above-mentioned embodiments describe that the power-receiving device 110 is disposed in the underwater mobile object 102 and the power-transmitting device 120 is disposed in the platform 103, but the present disclosure is not limited to this configuration. The power-transmitting device 120 may be disposed in the underwater mobile object and the power-receiving device 110 may be disposed in the platform 103.

For example, the above-mentioned embodiments describe that the underwater mobile object 102 is an autonomous unmanned underwater vehicle that can tracklessly navigate underwater, but the present disclosure is not limited to this configuration. The underwater mobile object 102 may be a manned underwater vehicle or the like.

For example, the platform 103 may be a station on water or a station in water or a ship. The present disclosure may employ a configuration in which the power-receiving device 110 and the power-transmitting device 120 are disposed in underwater mobile objects 102 and the underwater mobile object 102 on the power-transmitting device 120 side approaches, navigates in parallel, and supplies power during navigation of the underwater mobile object 102 on the power-receiving device 110 side.

The term "underwater mobile object" widely spread has been used to facilitate explanation, but it means a mobile object that navigates in liquid as well as water.

For example, in the second embodiment, the main thruster 104 disposed in the underwater mobile object 102 is used as the liquid flow device that applies a flow to liquid, but the present disclosure is not limited to this configuration. For example, the vertical thruster or the horizontal thruster of the underwater mobile object 102 may be used as the liquid flow device.

For example, a configuration in which a screw is disposed on the platform 103 side and a water current is sent to between the receiving-side pad 111 and the transmitting-side pad 121 may be employed.

For example, the present disclosure can exhibit particular advantages in combination with wireless power supply in a magnetic resonance system that can allow a large positional deviation, but may be combined with wireless power supply in another system such as an electromagnetic induction system.

For example, the configurations of the aforementioned embodiments can be appropriately replaced or combined.

INDUSTRIAL APPLICABILITY

According to the present disclosure, it is possible to provide a wireless power supply system, a power-transmitting device, and a power-receiving device that can appropriately cool a coil which emits heat due to wireless power supply underwater.

[Additional claim 1]

A power-transmitting device that performs wireless power supply to a power-receiving device having a relatively movable relationship using coil pairs disposed to be opposable, the power-transmitting device comprising:
 a recessed section configured to accommodate at least a part of the power-receiving device with a gap;
 a first coil configured to constitute the opposable coil pair on first wall portion of the recessed section facing each other; and
 a second coil configured to constitute the opposable coil pair on the second wall portion of the recessed section facing each other.

[Additional claim 2]

A power-transmitting device that performs wireless power supply to a power-receiving device having a relatively movable relationship using coil pairs disposed to be opposable, the power-receiving device being provided with a recessed section, the power-transmitting device comprising:
 a body of which at least a part is accommodated in the recessed section with a gap; a first coil disposed in the body and configured to constitute the opposable coil pair on first wall portion of the recessed section facing each other; and
 a second coil disposed in the body and configured to constitute the opposable coil pair on the second wall portion of the recessed section facing each other.

[Additional claim 3]

The power-transmitting device according to claim 1 or 2, further comprising a controller configured to control power supplied respectively to the first coil and the second coil on the basis of power supply efficiency of the respective coil pairs on one and the second wall portion of the recessed section facing each other.

[Additional claim 4]

The power-transmitting device according to claim 3, wherein the wireless power supply to the power-receiving device including a load which is supplied with power by the wireless power supply is performed, and
 the controller increases power which is supplied to the coil constituting the coil pair with higher power supply efficiency and decreases power which is supplied to the coil constituting the coil pair with lower power supply efficiency when the power supplied to the load is within a set range.

[Additional claim 5]

The power-transmitting device according to claim 3 or 4, wherein the wireless power supply to the power-receiving device including a load which is supplied with power by the wireless power supply is performed, and
 the controller decreases power which is supplied to the coil constituting the coil pair with lower power supply efficiency when the power supplied to the load is greater than a set range.

[Additional claim 6]

The power-transmitting device according to any one of claims 3 to 5, wherein the wireless power supply to the power-receiving device including a load which is supplied with power by the wireless power supply is performed, and
 the controller increases power which is supplied to the coil constituting the coil pair with higher power supply efficiency when the power supplied to the load is less than a set range.

[Additional claim 7]

The power-transmitting device according to any one of claims 1 to 6, further comprising a scraper member configured to drive away a foreign material which is present between the coil pairs with relative movement to the power-receiving device.

[Additional claim 8]

The power-transmitting device according to any one of claims 1 to 7, wherein the wireless power supply is performed underwater.

[Additional claim 9]

A power-receiving device that receives wireless power supply from a power-transmitting device having a relatively movable relationship using coil pairs disposed to be opposable, the power-receiving device comprising:
- a recessed section configured to accommodate at least a part of the power-transmitting device with a gap;
- a first coil configured to constitute the opposable coil pair on a first wall portion of the recessed section facing each other; and
- a second coil configured to constitute the opposable coil pair on a second wall portion of the recessed section facing each other.

[Additional claim 10]

A power-receiving device that receives wireless power supply from a power-transmitting device having a relatively movable relationship using coil pairs disposed to be opposable, the power-transmitting device being provided with a recessed section, the power-receiving device comprising:
- a body of which at least a part is accommodated in the recessed section with a gap; a first coil disposed in the body and configured to constitute the opposable coil pair on a first wall portion of the recessed section facing each other; and
- a second coil disposed in the body and configured to constitute the opposable coil pair on a second wall portion of the recessed section facing each other.

[Additional claim 11]

The power-receiving device according to claim 9 or 10, further comprising a scraper member configured to drive away a foreign material which is present between the coil pairs with relative movement to the power-transmitting device.

[Additional claim 12]

The power-receiving device according to any one of claims 9 to 11, wherein the wireless power supply is performed underwater.

[Additional claim 13]

A wireless power supply system that performs wireless power supply using coil pairs disposed to be opposable between a power-receiving device and a power-transmitting device of which at least one is movable, the wireless power supply system comprising:
- the power-transmitting device according to claim 1 as the power-transmitting device; and
- the power-receiving device according to claim 10 as the power-receiving device.

[Additional claim 14]

A wireless power supply system that performs wireless power supply using coil pairs disposed to be opposable between a power-receiving device and a power-transmitting device of which at least one is movable, the wireless power supply system comprising:
- the power-transmitting device according to claim 2 as the power-transmitting device; and
- the power-receiving device according to claim 9 as the power-receiving device.

What is claimed is:

1. A power-transmitting device that performs wireless power supply to a power-receiving device having a relatively movable relationship using a plurality of coil pairs, each coil pair comprising a transmitting coil of the power-transmitting device and a receiving coil of the power-receiving device disposed to be opposable to each other, the power-transmitting device comprising:
    - a recessed section configured to accommodate at least a part of the power-receiving device with a gap;
    - a first coil disposed on a first wall portion of the recessed section, the first coil constituting the respective transmitting coil of a first coil pair of the plurality of coil pairs and configured to face the respective receiving coil of the first coil pair;
    - a second coil disposed on a second wall portion of the recessed section, the second coil constituting the respective transmitting coil of a second coil pair of the plurality of coil pairs and configured to face the respective receiving coil of the second coil pair;
    - a transmitting-side power conversion circuit of the first coil connected to the transmitting side DC-AC conversion circuit of the first coil and configured to supply DC power to the transmitting-side DC-AC conversion circuit of the first coil;
    - a transmitting-side power conversion circuit of the second coil connected to the transmitting side DC-AC conversion circuit of the second coil and configured to supply DC power to the transmitting-side DC-AC conversion circuit of the second coil; and
    - a controller connected to both the transmitting-side power conversion circuit of the first coil and the transmitting-side power conversion circuit of the second coil and configured to calculate power supply efficiencies of the first coil pair and the second coil pair and increase and decrease power supplied to the first coil pair and the second coil pair by increasing and decreasing power command values to the transmitting-side power conversion circuit of the first coil and the transmitting-side power conversion circuit of the second coil according to the power supply efficiencies.

2. The power-transmitting device according to claim 1, wherein the wireless power supply to the power-receiving device supplies power to a load of the power-receiving device, and
    the controller increases power which is supplied to the first coil constituting the first coil pair of the plurality of coil pairs with higher power supply efficiency than the second coil pair of the plurality of coil pairs and decreases power which is supplied to the second coil constituting the second coil pair of the plurality of coil pairs with lower power supply efficiency than the first coil pair of the plurality of coil pairs when the power supplied to the load is within a set range.

3. The power-transmitting device according to claim 1, wherein the wireless power supply to the power-receiving device supplies power to a load of the power-receiving device, and
    the controller decreases power which is supplied to the first coil constituting the first coil pair of the plurality of coil pairs with lower power supply efficiency than the second coil pair of the plurality of coil pairs when the power supplied to the load is greater than a set range.

4. The power-transmitting device according to claim 1, wherein the wireless power supply to the power-receiving device supplies power to a load of the power-receiving device, and
the controller increases power which is supplied to the first coil constituting the first coil pair of the plurality of coil pairs with higher power supply efficiency than the second coil pair of the plurality of coil pairs when the power supplied to the load is less than a set range.

5. The power-transmitting device according to claim 1, further comprising a scraper member configured to drive away a foreign material which is present between the coil pairs with relative movement to the power-receiving device.

6. The power-transmitting device according to claim 1, wherein the wireless power supply is performed underwater.

7. A wireless power supply system comprising the power-transmitting device of claim 1 and the power-receiving device, wherein at least one of the power-transmitting device and the power receiving device is movable.

8. A power-transmitting device that performs wireless power supply to a power-receiving device having a relatively movable relationship using a plurality of coil pairs, each coil pair comprising a transmitting coil of the power-transmitting device and a receiving coil of the power-receiving device disposed to be opposable to each other, the power-receiving device being provided with a recessed section, the power-transmitting device comprising:
a body of which at least a part is accommodated in the recessed section with a gap;
a first coil disposed in the body, the first coil constituting the respective transmitting coil of a first coil pair of the plurality of coil pairs and configured to face the respective receiving coil of the first coil pair disposed on a first wall portion of the recessed section; and
a second coil disposed in the body, the second coil constituting the respective transmitting coil of a second coil pair of the plurality of coil pairs and configured to face the respective receiving coil of the second coil pair disposed on a second wall portion of the recessed section;
a transmitting-side power conversion circuit of the first coil connected to the transmitting side DC-AC conversion circuit of the first coil and configured to supply DC power to the transmitting-side DC-AC conversion circuit of the first coil;
a transmitting-side power conversion circuit of the second coil connected to the transmitting side DC-AC conversion circuit of the second coil and configured to supply DC power to the transmitting-side DC-AC conversion circuit of the second coil; and
a controller connected to both the transmitting-side power conversion circuit of the first coil and the transmitting-side power conversion circuit of the second coil and configured to calculate power supply efficiencies of the first coil pair and the second coil pair and increase and decrease power supplied to the first coil pair and the second coil pair by increasing and decreasing power command values to the transmitting-side power conversion circuit of the first coil and the transmitting-side power conversion circuit of the second coil according to the power supply efficiencies.

9. The power-transmitting device according to claim 8, wherein the wireless power supply to the power-receiving device supplies power to a load of the power-receiving device, and
the controller increases power which is supplied to the first coil constituting the first coil pair of the plurality of coil pairs with higher power supply efficiency than the second coil pair of the plurality of coil pairs and decreases power which is supplied to the second coil constituting the second coil pair of the plurality of coil pairs with lower power supply efficiency than the first coil pair of the plurality of coil pairs when the power supplied to the load is within a set range.

10. The power-transmitting device according to claim 8, wherein the wireless power supply to the power-receiving device supplies power to a load of the power-receiving device, and
the controller decreases power which is supplied to the first coil constituting the first coil pair of the plurality of coil pairs with lower power supply efficiency than the second coil pair of the plurality of coil pairs when the power supplied to the load is greater than a set range.

11. The power-transmitting device according to claim 8, wherein the wireless power supply to the power-receiving device supplies power to a load of the power-receiving device, and
the controller increases power which is supplied to the first coil constituting the first coil pair of the plurality of coil pairs with higher power supply efficiency than the second coil pair of the plurality of coil pairs when the power supplied to the load is less than a set range.

12. A wireless power supply system comprising the power-transmitting device of claim 8 and the power-receiving device, wherein at least one of the power-transmitting device and the power receiving device is movable.

* * * * *